(12) United States Patent
LaHorgue

(10) Patent No.: US 11,731,038 B2
(45) Date of Patent: *Aug. 22, 2023

(54) REGION DIVISION WITH CELL MERGING USING SPANNING TREE

(71) Applicant: Niantic, Inc., San Francisco, CA (US)

(72) Inventor: Katherine Elizabeth LaHorgue, Oakland, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,388

(22) Filed: Oct. 5, 2021

(65) Prior Publication Data

US 2022/0023753 A1  Jan. 27, 2022

Related U.S. Application Data

(63) Continuation of application No. 16/713,466, filed on Dec. 13, 2019, now Pat. No. 11,167,207.

(51) Int. Cl.
*A63F 13/216* (2014.01)
*A63F 13/30* (2014.01)
(Continued)

(52) U.S. Cl.
CPC ............ *A63F 13/216* (2014.09); *A63F 13/30* (2014.09); *A63F 13/65* (2014.09);
(Continued)

(58) Field of Classification Search
CPC ........ A63F 13/216; A63F 13/30; A63F 13/65; A63F 2300/69; H04N 19/70; G06F 16/9024; G06T 19/006
See application file for complete search history.

(56) References Cited

U.S. PATENT DOCUMENTS 6,574,553 B1 * 6/2003 Beesley ................. G01C 21/30
340/990
9,782,668 B1  10/2017 Golden et al.
(Continued)

FOREIGN PATENT DOCUMENTS

CN      1355495 A    6/2002
CN    103257876 A    8/2013
(Continued)

OTHER PUBLICATIONS

Detering, D., "Crunching the numbers: graph theory", Bulbanews Aug. 7, 2011, pp. 1-4, at https://bulbanews.bulbagarden.net/wiki/Crunching_the_numbers_Graph_theor-y.
(Continued)

*Primary Examiner* — Steve Rowland
(74) *Attorney, Agent, or Firm* — Fenwick & West LLP

(57) ABSTRACT

A location-based parallel reality game may use regions to determine how to disperse virtual elements, locate virtual experiences, and/or define game objectives. To determine the regions of the geographic area, a server divides the geographic region into cells. The server assigns real-world data to each of the cells and constructs a graph of nodes and edges based on the cells. Each node corresponds to a cell, and each edge connects nodes that correspond to adjacent cells. The server partitions the graph into contiguous segments based on the real-world data. The server defines regions of the geographic area based on the contiguous segments and stores the defined regions in a data store. The server may hierarchically partition the regions into higher order regions until each region meets a set of criteria.

20 Claims, 22 Drawing Sheets

(51) Int. Cl.
*A63F 13/65* (2014.01)
*H04N 19/70* (2014.01)
*G06F 16/901* (2019.01)
*G06T 19/00* (2011.01)

(52) U.S. Cl.
CPC ........ *G06F 16/9024* (2019.01); *G06T 19/006* (2013.01); *H04N 19/70* (2014.11); *A63F 2300/69* (2013.01)

(56) References Cited

U.S. PATENT DOCUMENTS

| | | | |
|---|---|---|---|
| 2005/0246711 A1* | 11/2005 | Berstis | H04W 4/029 718/105 |
| 2005/0267987 A1* | 12/2005 | Kareev | H04L 67/131 709/238 |
| 2014/0074553 A1 | 3/2014 | Sullivan | |
| 2014/0324844 A1 | 10/2014 | Hancock et al. | |
| 2015/0186389 A1* | 7/2015 | Zheng | G06F 16/9537 707/724 |
| 2015/0379027 A1 | 12/2015 | Glover et al. | |
| 2016/0189186 A1 | 6/2016 | Fabrikant et al. | |
| 2016/0363453 A1 | 12/2016 | Geelen | |
| 2018/0075694 A1 | 3/2018 | Frolov et al. | |
| 2018/0357589 A1* | 12/2018 | Bondareva | G06Q 10/063114 |
| 2019/0005719 A1* | 1/2019 | Fleischman | G06T 7/75 |
| 2019/0310653 A1* | 10/2019 | Lee | G05D 1/0238 |
| 2020/0026925 A1* | 1/2020 | Yu | G06V 20/56 |
| 2020/0293556 A1* | 9/2020 | Lysak | G06F 16/2272 |

FOREIGN PATENT DOCUMENTS

| | | |
|---|---|---|
| JP | 2014-071567 A | 4/2014 |
| JP | 2017-037445 A | 2/2017 |
| KR | 10-2014-0023383 A | 2/2014 |
| TW | 200519703 A | 6/2005 |

OTHER PUBLICATIONS

PCT International Search Report and Written Opinion, PCT Application No. PCT/IB2020/061415, dated Mar. 2, 2021, ten pages.

Taiwan Intellectual Property Office, Office Action, TW Patent Application No. 109143780, dated Aug. 10, 2021, 14 pages.

United States Office Action, U.S. Appl. No. 16/713,466, filed Jun. 14, 2021, six pages.

European Patent Office, Extended European Search Report and Opinion, EP Patent Application No. EP 20898493.0, Dec. 20, 2023, six pages.

Japan Patent Office, Office Action, JP Patent Application No. 2022-535831, Dec. 13, 2022, six pages.

Kenichi, T., "For beginner and veteran programmers! Seven pieces of useful common knowledge in the field," Nikkei Business Publications, Inc., vol. 17, Iss. 12, Jun. 24, 2014, pp. 46-47 (with concise explanation of relevance).

Osari, K. et al., "Interpolated Animation Between Two Illustrations," Information Processing Society of Japan 73rd National Convention, Mar. 2, 2011, pp. 4-93-4-94.

* cited by examiner

REGION DIVISION WITH CELL MERGING USING SPANNING TREE

CROSS REFERENCE TO RELATED APPLICATIONS

This application is a continuation of co-pending U.S. application Ser. No. 16/713,466, filed Dec. 13, 2019, which is incorporated by reference in its entirety.

TECHNICAL FIELD

The present disclosure relates generally to region divisions and, in particular, to identifying different regions for use in location-based games.

BACKGROUND

Location-based games use the real world as their geography. Parallel reality games are a type of location-based game that use a virtual world that parallels the real-world geography. The parallel virtual world may span the entire real world, and players from all over the world may interact and perform various game objectives in the parallel virtual world by navigating and performing actions in the real world. To allow similarly-located players to interact with one another, the virtual world (or a geographic area within the virtual world) may be partitioned into regions, which may each be associated with different virtual elements and game objectives. However, game play may be located more densely in some areas of the virtual world than others. If the regions are determined based only on area, the regions may be unbalanced, with some regions covering less game play than others.

SUMMARY

In a location-based parallel reality game, players navigate a virtual world by moving through the real world with a location-aware client device, such as a smartphone. As players navigate the virtual world, they may interact with virtual elements and participate in virtual experiences. These virtual elements and virtual experiences may be placed in strategically-located regions within the virtual world. The regions may streamline game play between similarly-located players by accounting for real-world data that corresponds to locations of the real world mapped to the virtual world, such as population density data, a player activity heatmap, point of interest locations, and terrain data.

Many client devices used by players in the parallel reality game may include positioning devices that track player location information as players move throughout the real world while playing the parallel reality game and interact with virtual elements in the parallel reality game. In various embodiments, client devices send the player location information to a server that hosts the parallel reality game. The game server may use this player location information, along with other real-world data, to determine how to partition the virtual world into regions for game play.

In one embodiment, the game server determines regions for a geographic area by dividing the geographic area into cells, assigning real-world data to each cell, and constructing a graph of edges and nodes. The game server may partition the graph into contiguous segments based on the real-world data and define regions of the geographic area based on the contiguous segments. The game server may store the regions in a data store, such as a game database, and update the regions as it receives more real-world data over time.

These and other features, aspects and advantages may be better understood with reference to the following description and appended claims. The accompanying drawings illustrate specific embodiments and, together with the description, serve to explain various principles. However, the drawings should not be considered limiting. Rather, the scope of protection should be determined from the claims.

DETAILED DESCRIPTION

Figure 1:
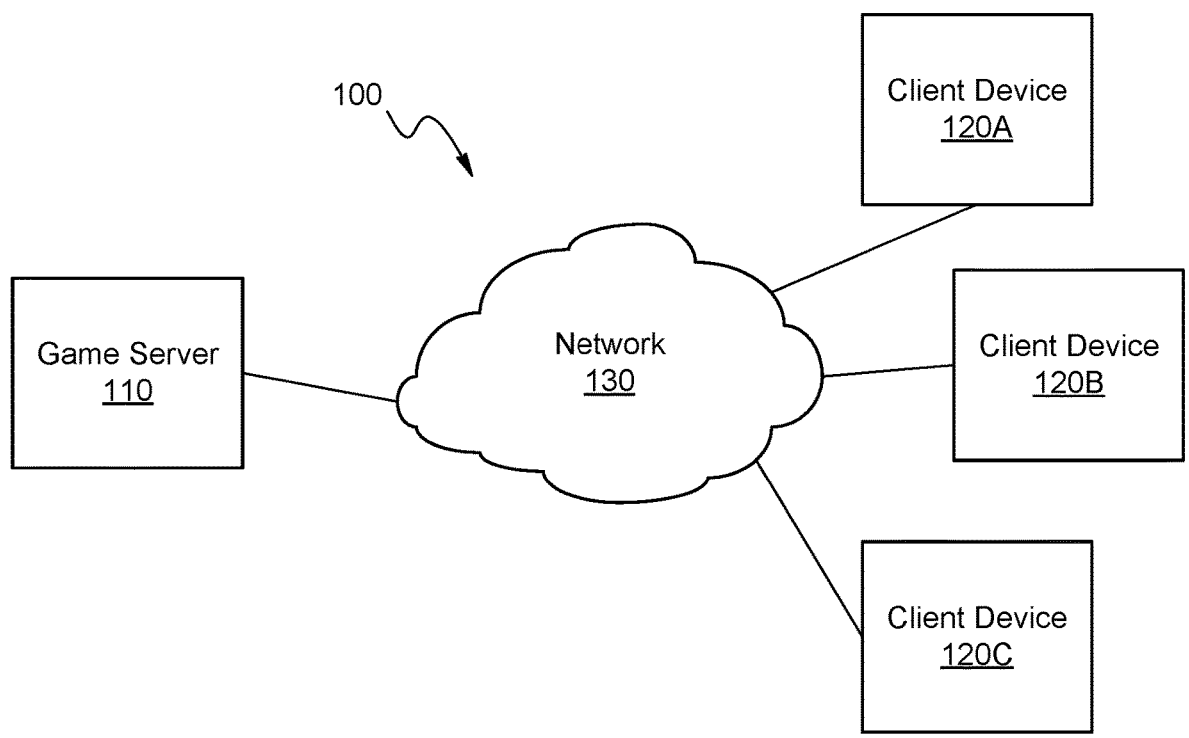
FIG. 1 is a block diagram illustrating a networked computing environment suitable for operating a location-based game, according to one embodiment.

Reference will now be made to several embodiments, examples of which are illustrated in the accompanying figures. It is noted that wherever practicable similar or like reference numbers are used in the figures to indicate similar or like functionality. Also, where similar elements are identified by a reference number followed by a letter, a reference to the number alone in the description that follows may refer to all such element, any one such element, or any combination of such elements. One skilled in the art will readily recognize from the following description that alternative embodiments of the structures and methods may be employed without departing from the principles described.

Overview

Generally, the present disclosure relates to determining regions of geographic areas. In various embodiments, parallel reality games occur in virtual worlds that are mapped to real world locations with the virtual world (and thus the real world) being divided into regions. Features of the parallel reality game may be related to the regions. For example, each region may have its own chat room, game objectives may involve players in different regions competing against each other (e.g., determining which region earns the most points in a given time period and providing a reward to players in the winning region), and the virtual elements present in regions may differ (e.g., the types of virtual elements in a region may be tied to real world properties of the region, such as urban/rural, elevation, presence of water, presence of green space, etc.). One of skill in the art may recognize other features of a parallel reality game that may be determined based entirely or in part on the division of the world into regions.

A game server can host a location-based parallel reality game having a player gaming area that includes a virtual environment with a geography that parallels at least a portion of the real-world geography. Players can navigate a virtual space in the virtual world by navigating a corresponding geographic space in the real world. In particular, players can navigate a range of coordinates defining a virtual space in the virtual world by navigating a range of geographic coordinates in the real world.

In one embodiment, a game server associated with a parallel reality game may partition a geographic area within the virtual world into regions. The game server may use the regions to distribute virtual elements and/or virtual experiences throughout the virtual world. To determine the regions for a geographic area, the game server may access real-world data describing the geographic area. Real-world data may include population density data, player density data, point of interest data and terrain data.

The game server may divide the geographic area into cells representing portions of the geographic area and assign real-world data to the cells. The game server uses the cells and respective real-world data to construct a graph of nodes and edges representing the geographic area. Each node represents a subset of real-world data corresponding to a cell, and each edge represents the difference in real-world data between the cells the edge connects. Starting at one of the nodes in the graph, the game server may create a contiguous segment of the graph by creating a maximum spanning tree of the graph. The game server groups nodes connected to one another in the maximum spanning tree into groups of nodes that collectively meet a set of criteria. The game server may create new contiguous segments for the rest of the graph until all of the graph has been partitioned into contiguous segments. The game server may define each contiguous segment as a region or create a new graph for the geographic area corresponding to the contiguous segment to further partition into a new set of contiguous segments.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real-world geography such that player movement and actions in the real-world affect actions in the virtual world and vice versa. Those of ordinary skill in the art, using the disclosures provided herein, should understand that the subject matter of the present disclosure is equally applicable to other gaming systems.

FIG. 1 illustrates an exemplary computer-implemented location-based gaming system 100 configured in accordance with an embodiment. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world. For example, a coordinate system in the real world (e.g., longitude and latitude) may be mapped to a coordinate system in the virtual world (e.g., x/y coordinates, virtual longitude and latitude, etc.).

In the embodiment shown in FIG. 1, the system 100 has a client-server architecture, where a game server 110 communicates with one or more client devices 120 over a network 130. Although three client devices 120 are illustrated in FIG. 1, any number of client devices 120 can be connected to the game server 110 over the network 130. In other embodiments, the distributed location-based gaming system 100 includes different or additional elements. Furthermore, the functions may be distributed among the elements in a different manner than described.

The game server 110 hosts a master state of the location-based game and provides game status updates to players' client devices 120 (e.g., based on actions taken by other players in the game, changes in real-world conditions, changes in game state or condition, etc.). The game server 110 receives and processes input from players in the location-based game. Players may be identified by a username or player ID (e.g., a unique number or alphanumeric string) that the players' client devices 120 send to the game server 110 in conjunction with the players' inputs.

In various embodiments, the game server 110 determines regions for the parallel reality game based on a snapshot of real-world data, including device position information, which indicates player locations in the real world. The game server 110 breaks a geographic region of the parallel reality game into cells (e.g., S2-cells) and assigns real-world data to each cell. The game server 110 creates a graph of nodes and edges based on the cells and corresponding real-world data. The game server 110 selects a node and determines a set of connected nodes, each connected by edges in the graph. The game server 110 merges the selected node and set of connected nodes together into a contiguous segment. The game server 110 may use the contiguous segment as a region for the parallel reality game, may further partition the contiguous segment, or may adjust the contiguous segment to meet one or more criteria. Various embodiments of the game server 110 are described in greater detail below, with reference to FIG. 3.

The client devices 120 are computing devices with which players can interact with the game server 110. For instance, a client device 120 can be a smartphone, portable gaming device, tablet, personal digital assistant (PDA), cellular phone, navigation system, handheld GPS system, or other such device. A client device 120 may execute software (e.g., a gaming application or app) to allow a player to interact with the virtual world. A client device 120 may also include hardware, software, or both for providing a user interface for chat rooms. A user may choose to join a chat room and send and receive messages via the user interface. Various embodiments of client device 120 are described in greater detail below, with reference to FIG. 2.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, S1v1TP, FTP), encodings or formats (e.g. HTML, JSON, XML), and/or protection schemes (e.g. VPN, secure HTTP, SSL).

Figure 2:
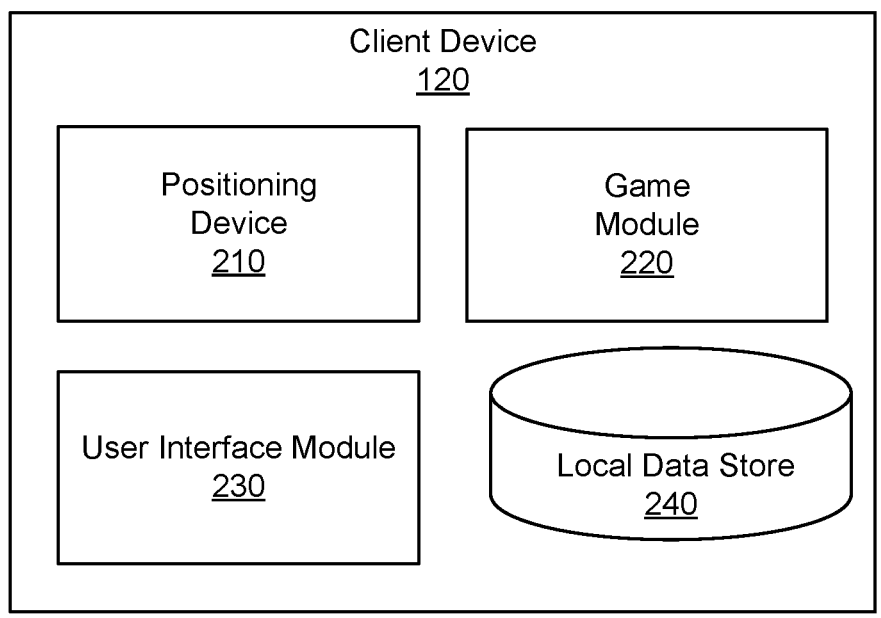
FIG. 2 is block diagram of a client device shown in FIG. 1, according to one embodiment.

FIG. 2 is block diagram of a client device 120 shown in FIG. 1, according to one embodiment. Because the gaming system 100 is for a location-based game, the client device 120 is preferably a portable computing device, such as a smartphone or other portable device, that can be easily carried or otherwise transported with a player. A player can interact with the virtual world simply by carrying or transporting the client device 120 in the actual world. The client device 120 can include a positioning device 210 that monitors the position of the client device 120 in the real world. The positioning device 210 can be any device or circuitry for monitoring the position of the client 120. For example, the positioning device 210 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 210 tracks the position of the player's client device 120 and provides the client device position information to the game module 220. The game module 220 updates the player's location in the virtual world based on coordinates of the position of the player's client device 120 in the real world. Thus, game module 220 maintains a local state of the virtual world on the client device 120. The game module 220 can provide player location information to the game server 110 over the network 130 such that the game server 110 maintains a total game state with updated player locations and provides the game module 220 with periodic updates so that the local game state can reflect the total game state.

The game module 220 communicates information about the virtual world with the user interface module 230. The user interface module 230 of the client device 120 constructs and displays components of the user interfaces of the client device 120. The user interface may display depictions of the virtual world to the user including components of the virtual world, such as virtual elements and virtual experiences, as received from the game module 220. The user interface module 230 may also display chat room locations in the virtual world, as well as messages sent between users in the chat rooms. A user may interact with the client device 120 to engage with virtual elements, participate in virtual experiences, or converse in chat rooms. For example, the user interface module 230 may display a view of the virtual world depicting points of interest, chat rooms, and other virtual experiences. The user of the client device 120 can interact with these components via the user interface to complete a task, join a chat room, or participate in a raid, among other actions.

The local data store 240 is one or more computer-readable media configured to store data used by the client device 120. For example, the local data store 240 may store the player location information tracked by the positioning device 210, a local copy of the current state of the parallel reality game, or any other appropriate data. Although the local data store 240 is shown as a single entity, the data may be split across multiple media. Furthermore, data may be stored elsewhere (e.g., in a distributed database) and accessed remotely via the network 130.

Figure 3:
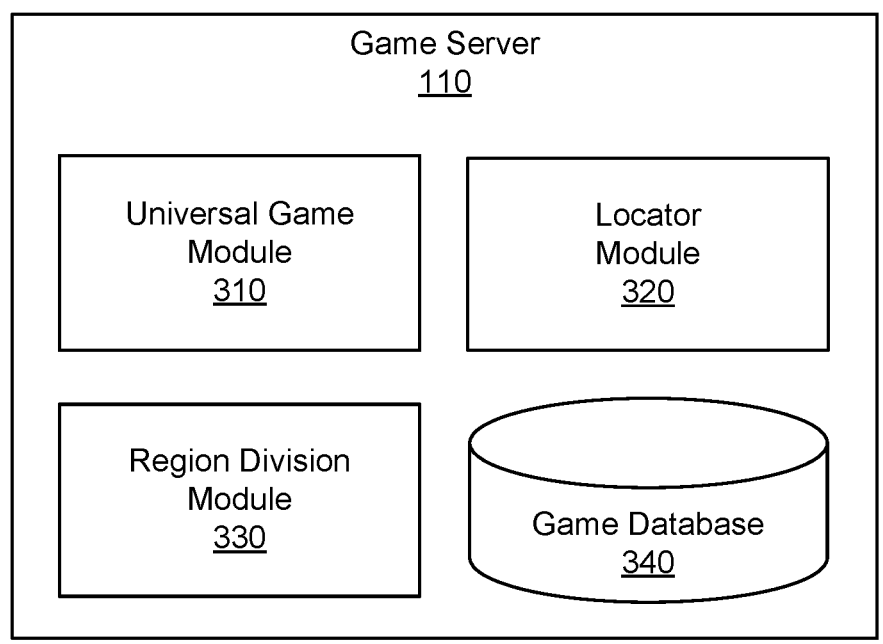
FIG. 3 is a block diagram of the game server shown in FIG. 1, according to one embodiment.

FIG. 3 illustrates one embodiment of the game server 110 suitable for hosting a location-based parallel reality game. In the embodiment shown, the game server 110 includes a universal game module 310, a locator module 320, a region division module 330, and a game database 340. In other embodiments, the game server 110 contains different or additional elements. In addition, the functions may be distributed among the elements in a different manner than described.

The game server 110 can be configured to receive requests for game data from one or more client devices 120 (for instance, via remote procedure calls (RPCs)) and to respond to those requests via the network 130. For instance, the game server 110 can encode game data in one or more data files and provide the data files to a client device 120. In addition, the game server 110 can be configured to receive game data (e.g. player location, player actions, player input, etc.) from one or more client devices 120 via the network 130. For instance, the client device 120 can be configured to periodically send player input, player location, and other updates to the game server 110, which the game server 110 uses to update game data in the game database 340 to reflect changed conditions for the game. The game server 110 may also send game data to client devices 120, such as other player locations, chat room locations, virtual element locations.

The universal game module 310 hosts the location-based game for players and acts as the authoritative source for the current status of the location-based game. The universal game module 310 receives game data from client devices 120 (e.g., player input, player location, player actions, player status, landmark information, etc.) and incorporates the game data received into the overall location-based game for all players of the location-based game. With the game data, the universal game module 310 stores a total game state of the game that can be sent to a client device 120 to update the local games state in the game module 220. The universal game module 310 can also manage the delivery of game data to the client devices 120 over the network 130.

The locator module 320 can be a part of or separate from the universal game module 310. The locator module 320 is configured to access data associated with real world actions, analyze the data, and determine virtual experiences in the virtual world based on the data associated with real world actions. For instance, the locator module 320 can modify game data stored in the game database 340 to locate virtual experiences in the virtual world based on the data associated with real world actions. As an example, a sponsored virtual element may be at a virtual location that corresponds to the real-world location of a sponsor's store, restaurant, outlet, etc. If a player makes a purchase, enters a code made available at the real-world location, or takes another action at the real-world location action meeting specified criteria, a special virtual experience may be made available to the player in the parallel reality game.

The region division module 330 determines regions within the virtual world. The region division module 330 may divide a geographic area of the virtual world into regions based on real-world data. In some embodiments, the geographic area of the virtual world may correspond to the entire real world. In other embodiments, the geographic area corresponds to a smaller portion of the real world, such as a region previously determined by the region division module 330 or a region identified by an operator (e.g., using a ringfence).

The region division module 330 divides the geographic area into cells covering portions of the geographic area. The cells are geometric shapes that divide up the geographic area into smaller geographic areas. The size of the cells may be determined via input from a provider or based on the size of the geographic area. In some embodiments, the cells are S2-cells, which are hierarchical cells that divide up a spherical area.

The region division module 330 accesses real-world data for the geographic area from the game database 340. Real-world data may include population data, player density data, point of interest data, and terrain data and corresponds to locations in the geographic area. The real-world data is further described in relation to the game database 340.

The region division module 330 assigns real-world data to cells in the geographic area and constructs a graph of edges and nodes based on the cells. The region division module 330 places a node in each cell (e.g., in the geographic center of the cell) and weights each node using the real-world data. Each node is weighted by a node weight, which is the population size of the corresponding cell. In some embodiments, the region division module 330 may use different or additional real-world data for the node weights. For example, in one embodiment, the node weights are a weighted combination of population data, player density data, terrain data, and/or number of points of interest for the corresponding cells. In other embodiments, the node weights may include global population data reweighted by estimates of user participation percentage per cell based on the country or urbanization level of the cell. The region division module 330 connects the nodes of adjacent cells with edges and weights each edge by an edge weight. In one embodiment, the edge weight is the difference in node weights of the nodes the edge connects. Alternatively, the edge weight may be a weighted combination of the difference between different elements of the real-world data (e.g., player density and population density) assigned to each of the adjacent cells of the connected nodes. The structure of the graph created by the region division module 330 is further described in relation to FIGS. 4A-4B.

The region division module 330 constructs a spanning tree (e.g. a maximum spanning tree) from the graph of the geographic area. The maximum spanning tree contains the nodes of the graph connected by a subset of the edges of the graph such that the total edge weight of all of the edges in the maximum spanning tree is maximized. Further, the maximum spanning tree does not have loops between nodes, which occur when a set of edges in the maximum spanning tree create two different pathways that connect the same pair of nodes. Starting with the nodes of the graph as a forest, the region division module 330 adds edges to connect the nodes in the forest to construct the maximum spanning tree.

In one embodiment, the region division module 330 determines which edges to add to the forest using Kruskal's algorithm. In this embodiment, the region division module 330 determines an edge of the graph with the highest weight (i.e., difference in population) that that does not form a loop between nodes in the forest and adds the edge to the forest. The region division module 330 then determines the edge with the next highest weight in the graph and adds the edge to the forest if the edge does not form a loop. If the graph contains multiple edges of the next highest weight that do not form a loop, the region division module 330 may randomly select one of the edges to add to the forest. The region division module 330 iterates, adding edges to the forest until all of the nodes in the forest are connected and form a maximum spanning tree.

In another embodiment, the region division module 330 determines which edges to add to the forest using Prim's algorithm. In this embodiment, the region division module 330 randomly selects a node of the graph as a parent node. Starting again with a forest of the nodes of the graph, the region division module 330 determines which edge connected to the parent node has the highest weight that does not form a loop and adds the edge to the forest. The region division module 330 then determines the edge with the next highest weight connected to any node in the forest and adds the edge to the forest so long as it does not form a loop between nodes in the forest. The region division module 330 iterates upon adding edges to the forest until all of the nodes in the forest are connected and form a maximum spanning tree. In further embodiments, the region division module 330 may use other algorithms to generate the spanning tree.

In some embodiments, the region division module 330 removes nodes from the graph based on the real-world data before constructing the maximum spanning tree. For example, the region division module 330 determines which cells of the geographic area are associated with terrain data indicating that the corresponding portions of the geographic area are covered by water and removes the nodes associated with the cells from the graph. In some embodiments, the region division module 330 only removes nodes associated with a threshold percentage of water in the corresponding portions of the geographic area. In further embodiments, the region division module 330 also removes nodes associated with terrain data indicating terrain that would be difficult for players to traverse, such as mountains or canyons. The region division module 330 then constructs the maximum spanning tree using nodes from the remaining graph to avoid determining regions for the parallel reality game that are covered by water. The region division module 330 partitions the maximum spanning tree into contiguous segments. Contiguous segments are groupings of connected nodes within the maximum spanning tree. Each contiguous segment corresponds to the portion of the geographic area covered by the cells of the nodes of the contiguous segment. The region division module 330 determines a number of contiguous segments into which the maximum spanning tree will be segmented and determines a minimum population each contiguous segment corresponds to based on the total population and the number of contiguous segments. Therefore, each contiguous segment corresponds to a minimum population size based on the node weights of the nodes of the contiguous segment. In some embodiments, each contiguous segment satisfies other criteria related to the node weights such as containing a minimum number of players or a minimum number of points of interest. Further criteria may require the contiguous segment to correspond to a minimum area size or particular terrain data.

In one embodiment, to form a contiguous segment, the region division module 330 selects each leaf node of the maximum spanning tree. A leaf node is a node in the maximum spanning tree that is only connected to one other node in the maximum spanning tree, known as the leaf node's parent node. The region division module 330 compares the node weight of each leaf node to the minimum population size (or other node weight-related criteria). If the leaf node has a node weight greater than the minimum population size, the region division module 330 removes the leaf node from the maximum spanning tree to form a contiguous segment. If not, the region division module 330 merges the leaf node with its parent node in the maximum spanning tree. To merge the leaf node into its parent node, the region division creates a merged node in place of the parent node with a node weight of the sum of the leaf node's node weight and the parent node's node weight. This process is further illustrated in relation to FIGS. 5A-5H. The region division module 330 continues comparing the node weights of leaf nodes to the minimum population size and either removing or merging the leaf nodes until a threshold number of contiguous segments have been formed. The region division module 330 uses the remaining nodes of the maximum spanning tree as a final contiguous segment.

In some embodiments, if the region division module 330 runs out of leaf nodes to merge to partition contiguous segments from the maximum spanning tree, the region division module 330 generates a new maximum spanning tree from the remaining graph (i.e., without the removed nodes of the contiguous segments) to partition contiguous segments from. Using a graph of the remaining maximum spanning tree, the region division module 330 reweights each edge of the graph. In some embodiments, the region division module 330 reweights each edge with an edge weight that is a random percentage of its previous edge weight. The region division module 330 generates a new maximum spanning tree using the reweighted graph and partitions contiguous segments from the new maximum spanning tree.

The region division module 330 adjusts the contiguous segments to improve the shape of the portion of the geographic area associated with each contiguous segment. For each pair of contiguous segments, region division module 330 combines the contiguous segments in the pair into a new graph, forms a maximum spanning tree of the graph based on the weights, and partitions the maximum spanning tree into two new contiguous segments. The region division module 330 scores each new contiguous segment and each contiguous segment from the pair with a compactness score to determine if the new contiguous segments improve the compactness of the portion of the geographic area covered by the pair of contiguous segments. In some embodiments, the region division module 330 uses Equation 1 to determine the compactness score for each contiguous segment, where $n_{segment}$ is the number of cells of the contiguous segment and $n_{boundary}$ is the number of cells of the contiguous segment that create an internal boundary inside of the contiguous segment.

$$\frac{n_{segment}}{n_{boundary}^2} \quad \text{Equation 1}$$

In other embodiments, the region division module 330 uses Equation 2 to determine the compactness score for each contiguous segment, where R is the contiguous segment, $\Omega$ is the set of cells in the contiguous segment that form the internal boundary inside of the contiguous segment, and $w_v$ is the node weight of each node in the contiguous segment.

$$\frac{\sum_{v \in R} w_v}{(\sum_{v \in \Omega} w_v)^2} \quad \text{Equation 2}$$

The region division module 330 compares the compactness scores of the new contiguous segments and the contiguous segments of the pair. If the new contiguous segments have higher compactness scores than the contiguous segments of the pair, then the region division module 330 replaces the contiguous segments of the pair with the new contiguous segments. In some embodiments, the region division module 330 determines an average compactness score for the new contiguous segments and the contiguous segments from the pair and uses the average compactness scores to determine whether to keep or replace the contiguous segments from the pair. In some embodiments, the region division module 330 adjusts the contiguous segments until each contiguous segment reaches a threshold compactness score. In other embodiments, the region division module 330 adjusts the contiguous segments until the region division module 330 has calculated compactness scores for each pair of contiguous segments without replacing any of the contiguous segments.

The region division module 330 merges adjacent contiguous segments that do not meet a set of constraints. The set of constraints include a minimum area associated with each contiguous segment and the minimum population size. In some embodiments, the set of constraints may further include a minimum number of points of interest associated with the portion of the geographic area related to the contiguous segment or a minimum amount of traversable area related to contiguous segment based on terrain data. The region division module 330 identifies contiguous segments that do not meet the set of constraints and merges the contiguous segment with each of its neighboring (i.e., surrounding the contiguous segment in the graph) contiguous segments. The region division module 330 re-partitions the merged contiguous segments into a new set of contiguous segments with either one less contiguous segments than the number of contiguous segments that were merged, the number of contiguous segments possible for the portion of the geographic area of the merged contiguous segments given the minimum area constraint, or the number of contiguous segments possible for the portion of the geographic area of the merged contiguous segments given the minimum population constraint.

The region division module 330 determines the geographic regions corresponding to each contiguous segment and defines each geographic region as a region for the parallel reality game. The region division module 330 stores each region in the game database 340 or, in some embodiments, in another data store. The region division module 330 may use the regions for a given period of time (e.g., a day, month, year, etc.) and may periodically update regions as the game server 110 receives more real-world data.

In some embodiments, the region division module 330 treats the defined regions as a set of first order regions and determines a set of second order regions for each first order region. For each first order region, the region division module 330 divides the first order region into second order cells, which are smaller in size than the cells used for the first order regions. The region division module 330 assigns real-world data to the cells, constructs a second order graph of nodes and edges, and generates a second order maximum spanning tree from the second order graph. The region division module 330 partitions the graph into a set of second order contiguous segments using a smaller minimum population, which may be smaller by a factor of the number of contiguous segments, and defines and stores the geographic regions corresponding to the second order contiguous segments as second order regions. The region division module 330 may iterate on determining higher order regions of previously determined regions until a set of criteria, such as covering less than a threshold portion of the geographic area or corresponding to less than a threshold population size, are met. In some embodiments, the region division module 330 may define regions for the parallel reality game at different orders until it reaches a threshold number of regions that each meet the set of criteria. For example, the region division module 330 may determine that a subset of the set of first order regions meet the set of criteria and only determine a set of second order regions for the regions of the set of first order regions that do not meet the set of criteria. The region division module 330 may continue hierarchically partitioning the geographic area by determining sets of higher order regions until all defined regions meet the set of criteria.

The region division module 330 may assign chat rooms or any other suitable game element, experience, or mechanic to regions. For example, in one embodiment, the region division module 330 creates a chat room for each region, such that a player may join the chat room assigned to the region they are currently located in or may join a different chat room upon moving to another region. In another example, the region division module 330 assigns a virtual competition to each region, such that players within the region can compete against one another to earn a reward. In a further embodiment, the region division module 330 periodically calculates scores for each region (e.g., by summing the scores earned by all players, or all players on a team, within the region) and provides rewards within regions for which the corresponding score exceeds a threshold, or exceeds the score of one or more neighboring regions. One of skill in the art will recognize numerous ways in which regions may be used in a parallel reality game.

The game database 340 includes one or more machine-readable media configured to store game data used in the location-based game to be served or provided to client devices 120 over the network 130. The game data stored in the game database 340 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, player inventory, current player locations in the virtual world/real world, player energy level, player preferences, team information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements, corresponding actual world position information for virtual elements, behavior of virtual elements, relevance of virtual elements, etc.); (5) data associated with real world objects, landmarks, positions linked to virtual world elements (e.g. location of real world objects/landmarks, description of real world objects/landmarks, relevance of virtual elements linked to real world objects, etc.); (6) game status (e.g. current number of players, current status of game objectives, player leaderboard, etc.); (7) data associated with player actions/input (e.g. current player locations, past player locations, player moves, player input, player queries, player communications, etc.); (8) data associated with virtual experiences (e.g., locations of virtual experiences, players actions related to virtual experiences, virtual events such as raids, etc.); and (9) any other data used, related to, or obtained during implementation of the location-based game. The game data stored in the game database 340 can be populated either offline or in real time by system administrators or by data received from players, such as from one or more client devices 120 over the network 130.

The game database 340 may also store real-world data. The real-world data may include population density data describing the aggregate locations of individuals in the real world; player density data describing the aggregate locations of players in the real world; player actions associated with locations of cultural value or commercial value; player heat map data describing the distribution of game actions in a geographic area; point of interest data describing real-world locations that correspond to locations of virtual elements in the virtual world; terrain data describing the locations of various terrains and ecological conditions, such as large bodies of water, mountains, canyons, and more; map data providing the locations of roads, highways, and waterways; current and past locations of individual players; hazard data; weather data; event calendar data; activity data for players (e.g., distance travelled, minutes exercised, etc.); and other suitable data. The real-world data can be collected or obtained from any suitable source. For example, the game database 340 can be coupled to, include, or be part of a map database storing map information, such as one or more map databases accessed by a mapping service. As another example, the game server 110 can be coupled to one or more external data sources or services that periodically provide population data, hazard data, weather data, event calendar data, or the like.

Other modules beyond the modules shown in FIG. 3 can be used with the game server 110. Any number of modules can be programmed or otherwise configured to carry out the server-side functionality described herein. In addition, the various components on the server-side can be rearranged. Other configurations will be apparent in light of this disclosure and the present disclosure is not intended to be limited to any particular configuration.

Region Division Examples

Figure 4A:
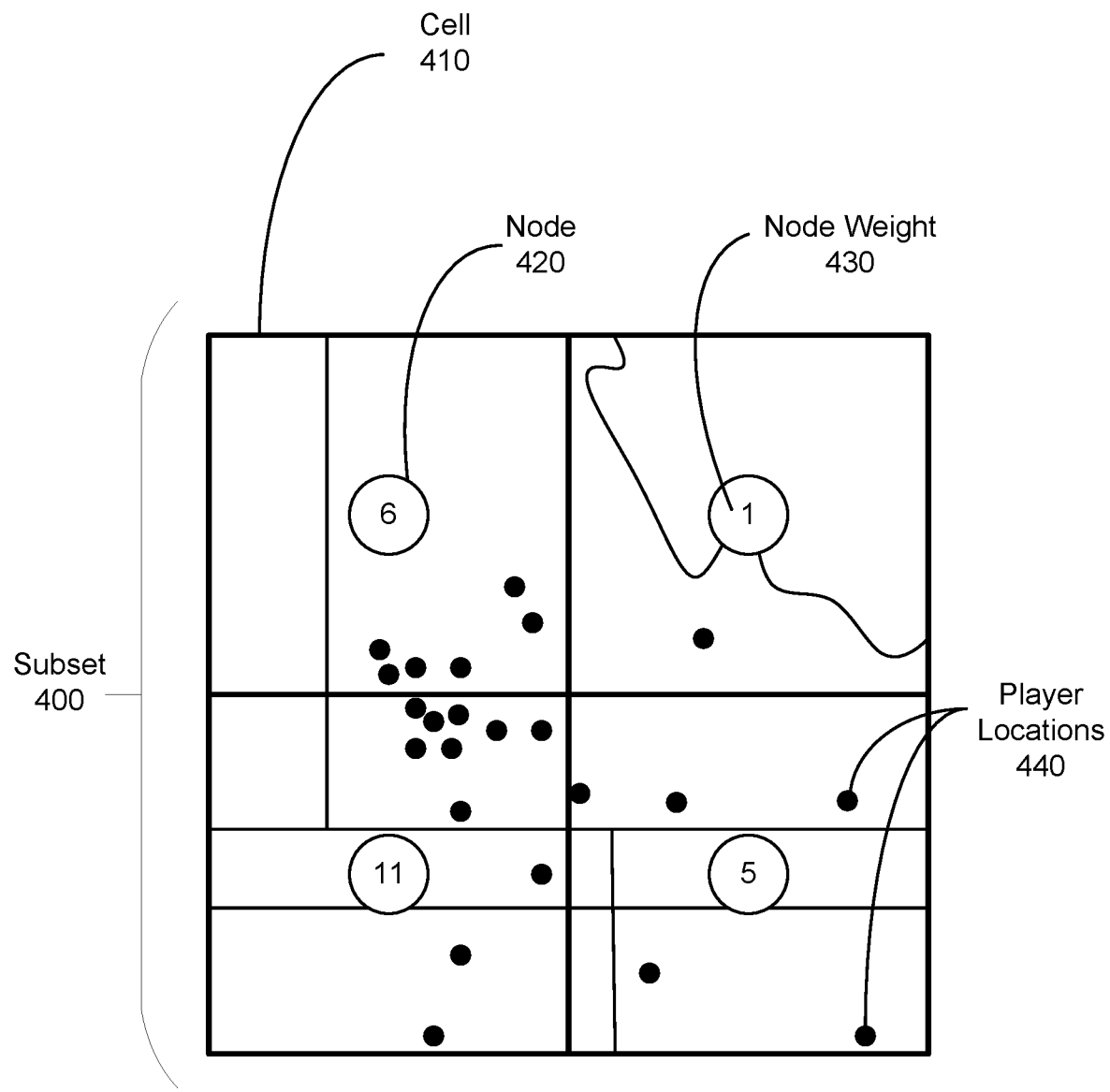
FIGS. 4A-4B illustrate converting cells of a subset of a geographic region into a graph of nodes and edges, according to one embodiment.
Figure 4B:
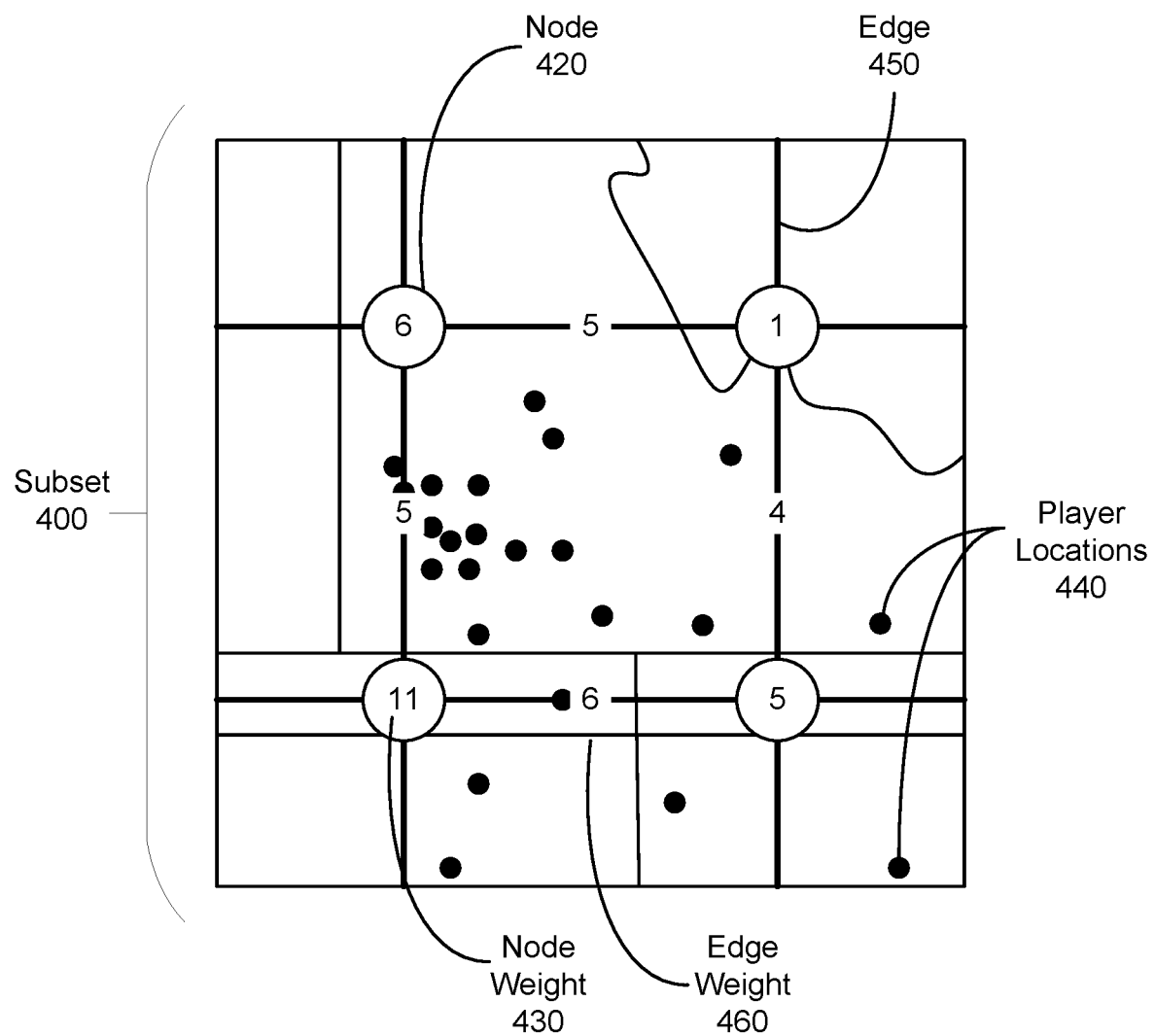

FIGS. 4A-4B illustrate converting cells 410 of a subset 400 of a geographic area into a graph of nodes 420 and edges 450, according to one embodiment. Though only a subset of the geographic area is shown in FIG. 4A, the region division module 330 divides the entire geographic area into a set of cells 410 that each cover a portion of the geographic area. The region division module 330 places a node 420 at the center of each cell 410 of the geographic area and weights each node using real-world data from the game database 340. In this embodiment, the real-world data describes the player locations in each cell 410, and each node weight 430 is the number of player locations 440 in the associated cell. As shown in FIG. 4B, the region division module 330 connects each node 420 in the geographic area with edges 450 to create a graph for the geographic area. The region division module 330 weights each edge 450 by an edge weight 460, which is the difference between the node weights 420 in this embodiment.

Figure 5A:
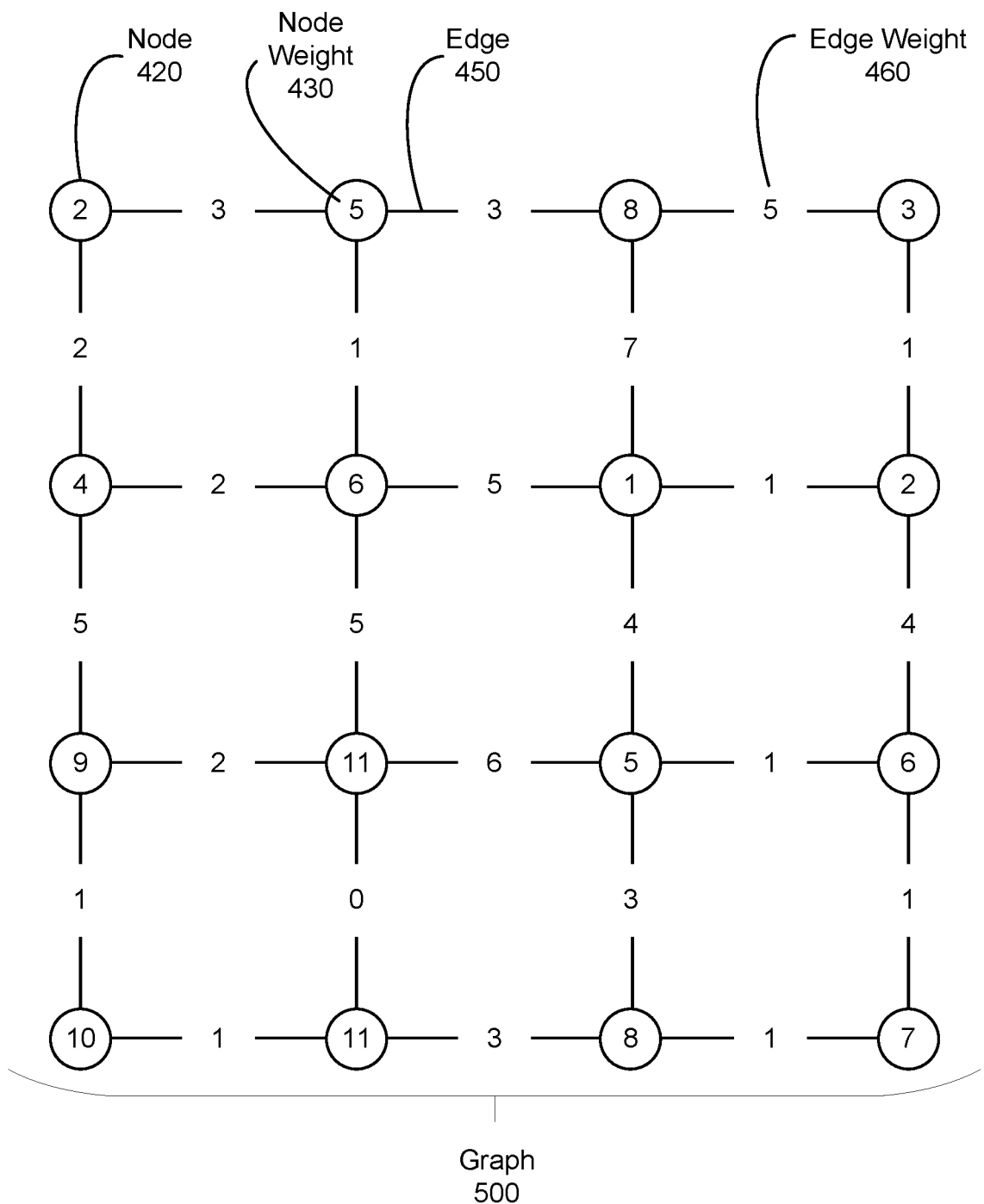
FIGS. 5A-5H illustrate an example of partitioning a graph of a geographic region into contiguous segments, according to one embodiment.

FIGS. 5A-5H illustrate an example of partitioning a graph 600 of a geographic area into contiguous segments, according to one embodiment. The region division module 330 maps the geographic area to a set of nodes 420 and edges 450 to create a graph 500, as shown in FIG. 5A. Each node associated with a node weight 430 based on real-world data, such as population of the corresponding cell, and each edge 450 is associated with an edge weight 460 that is the difference in the node weights 430 of the nodes 420 the edge 450 connects.

Figure 5B:
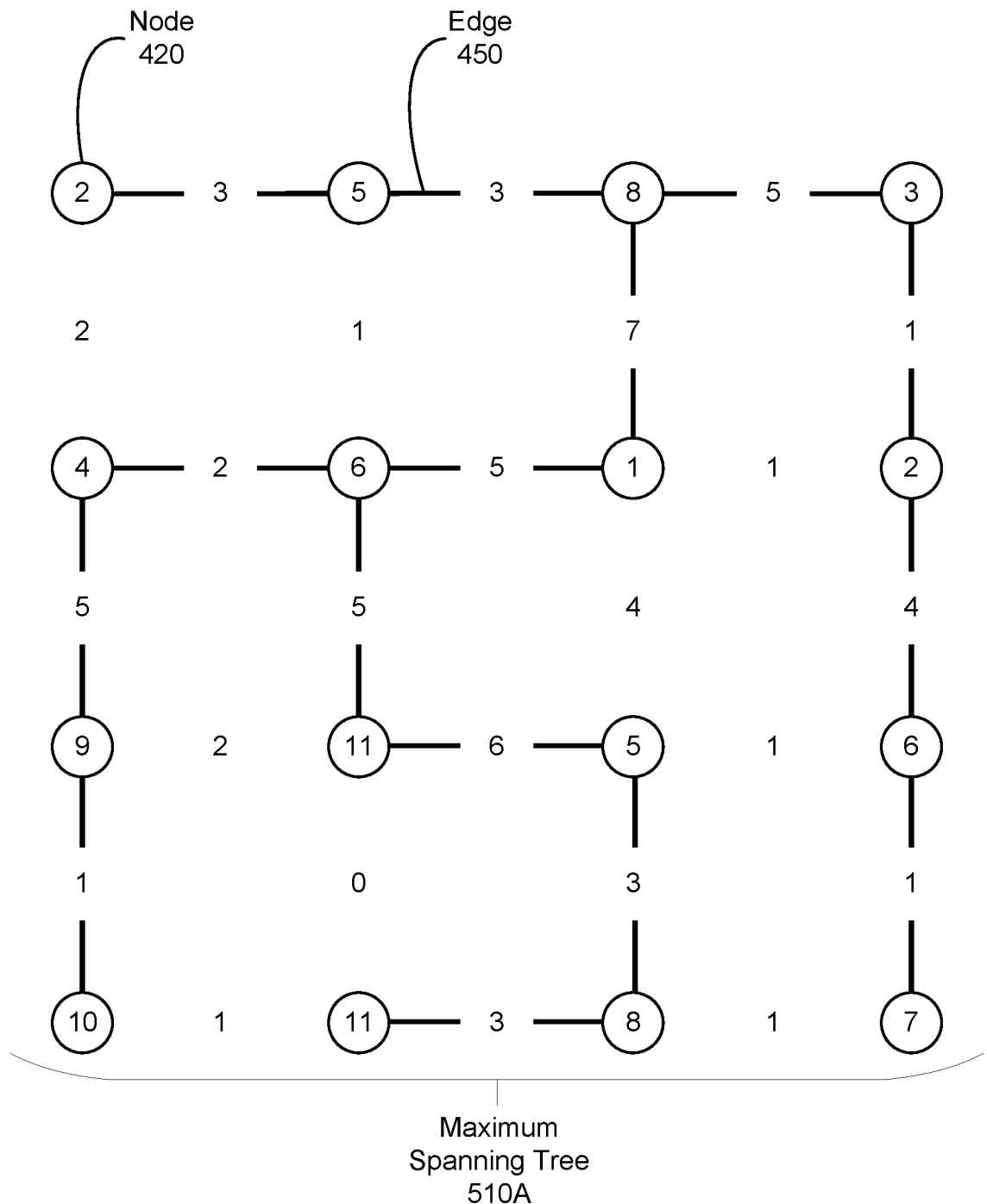

The region division module 330 creates a maximum spanning tree 510A from the graph 500, as shown in FIG. 5B. The maximum spanning tree connects all of the nodes 420 of the graph 500 using a subset of the edges 450 with the highest edge weights 450. The region division module 330 may employ different methods to create the maximum spanning tree 510A, so in other embodiments, the region division module 330 may generate different versions of the maximum spanning tree 510A from the same graph 500.

Figure 5C:
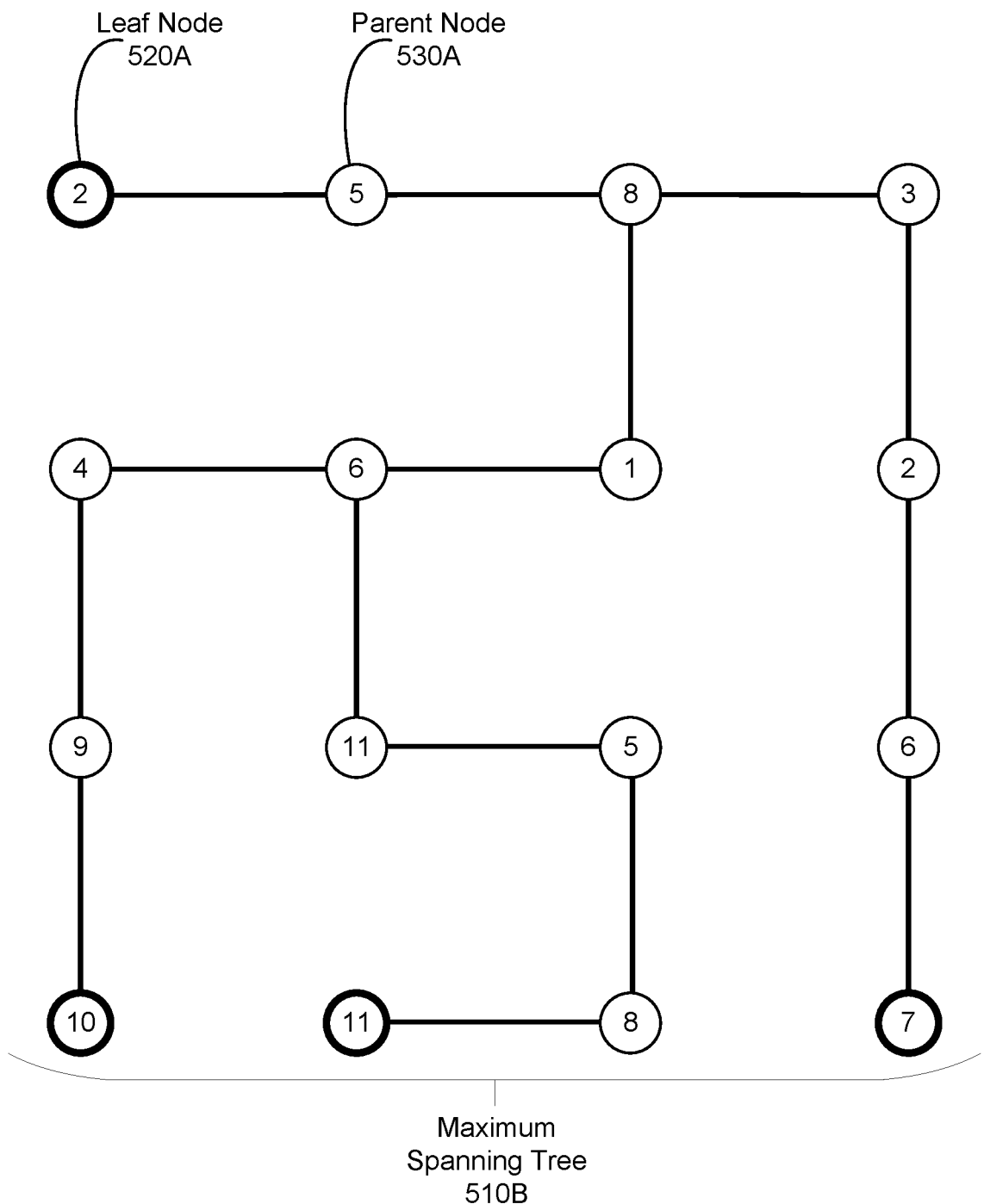

To determine contiguous segments to partition from the graph 500, the region division module 330 analyzes each of the leaf nodes 520A of the maximum spanning tree 510B shown in FIG. 5C. Each leaf node 520A is only connected to one other node, which is the leaf node's 520A parent node 530A. The region division module 330 determines if the node weight 430 of each leaf node 520A is larger than a node weight-related criteria, such as a minimum population size. In this example, the region division module 330 is using a minimum node weight of twenty for the node weight-related criteria.

Figure 5D:
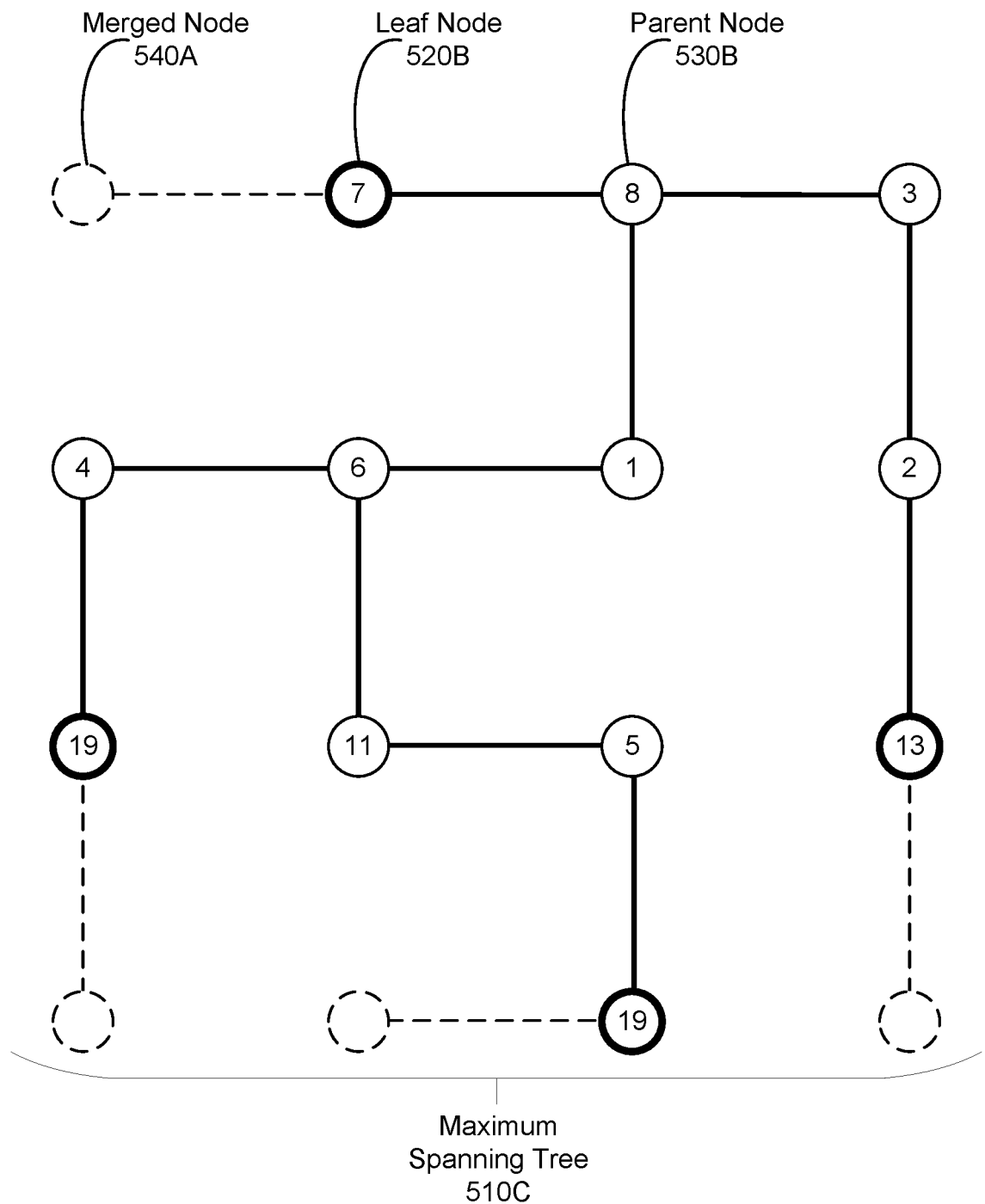

Since none of the leaf nodes 520A of the maximum spanning tree 510A satisfy the node weight-related criteria, the region division module 330 merges each leaf node 520A into its parent node 530A, resulting in a new maximum spanning tree 510C, shown in FIG. 5D. The maximum spanning tree 510C has a new set of leaf nodes 520B and parent nodes 530B. Each new leaf node 520B has a node weight 430 that is a combination of the node weights 430 of the previous corresponding leaf node 520A and parent node's 530A. Each previous leaf node 520A is represented by a merged node 540A, which covers a portion of the graph 500 but does not contribute a weight to the maximum spanning tree 510C.

Figure 5E:
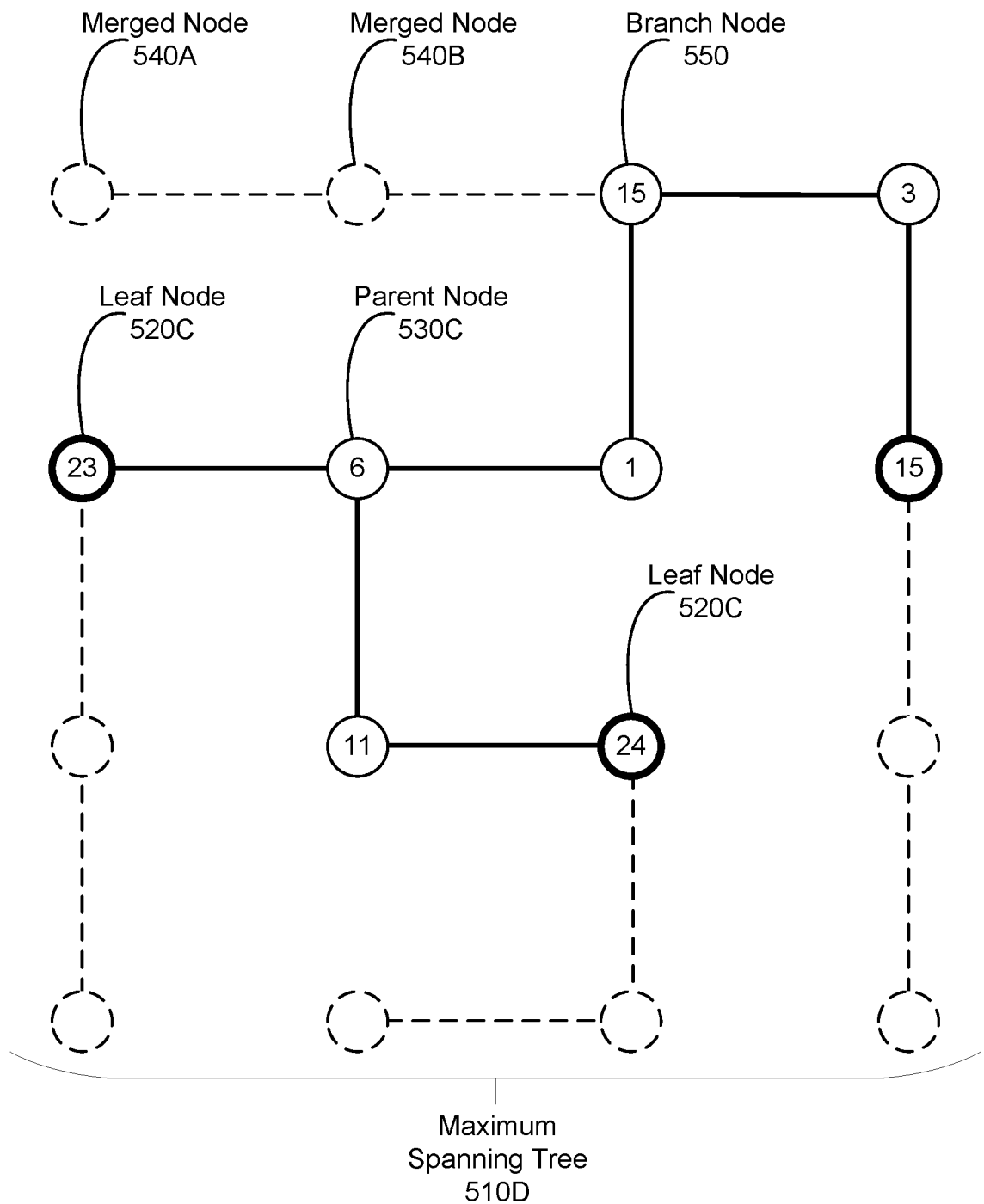

Again, none of the leaf nodes 520B of the maximum spanning tree 510B satisfy the node weight-related criteria, so the region division module 330 merges each leaf node 520B into its parent node 530B, resulting in a new maximum spanning tree 510D with a new set of leaf nodes 520C and parent nodes 530C, shown in FIG. 5E. The maximum spanning tree 510E also contains a branch node 550, which is a node 420 that is not a leaf node 520 but is connected to one or more merged nodes 540.

Figure 5F:
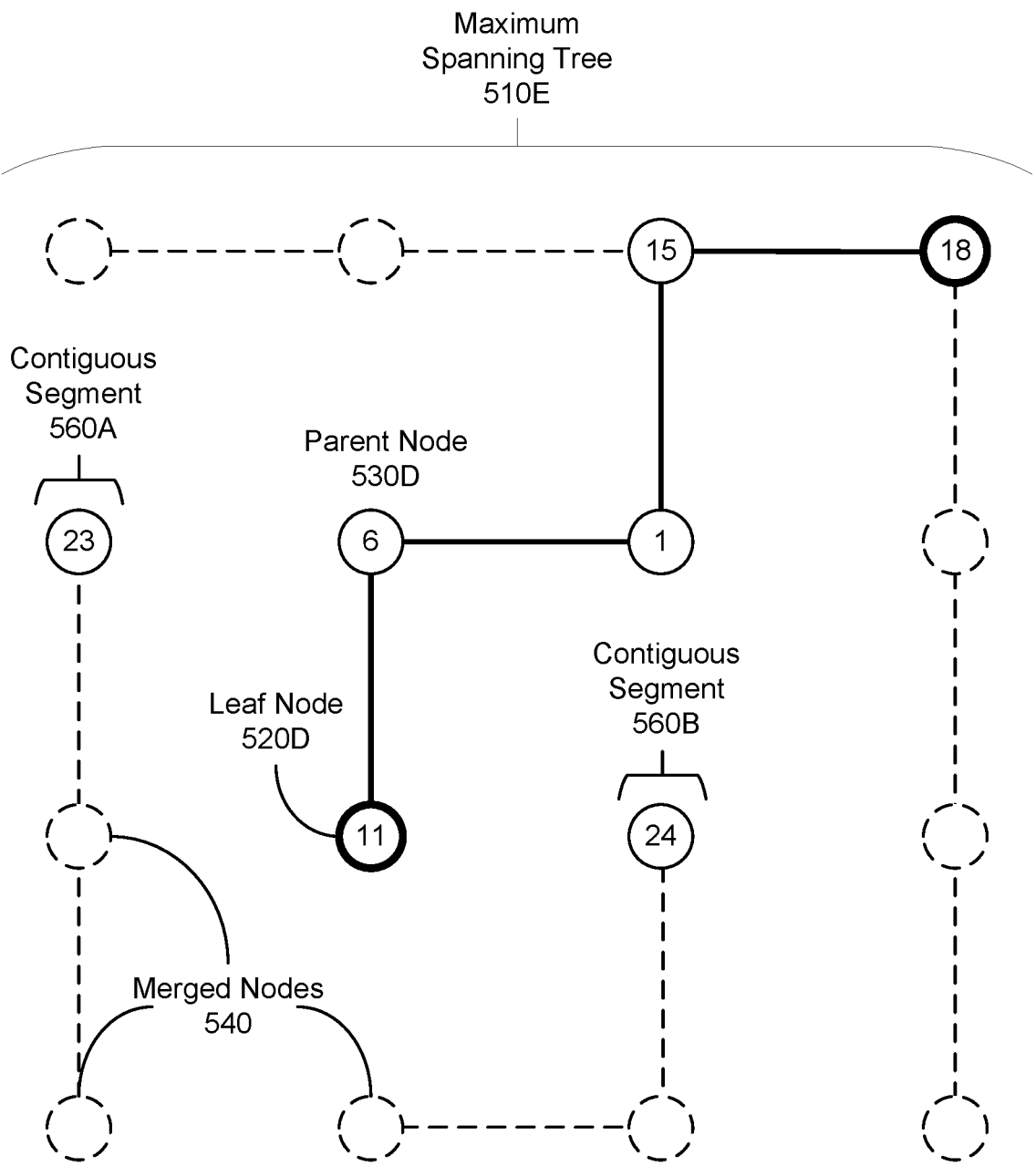

The maximum spanning tree 510D includes leaf nodes 520C that satisfy the node weight-related criteria (i.e., have a node weight over 20), so the region division module 330 disconnects the leaf nodes 520C that satisfy the node weight-related criteria from the maximum spanning tree 510C, as shown in FIG. 5F. These leaf nodes 520C and the connected merged nodes 540 form two contiguous segments 560. The rest of the nodes 420 and edges 450 form the remaining maximum spanning tree 510E with new leaf nodes 520D and parent nodes 530D.

Figure 5G:
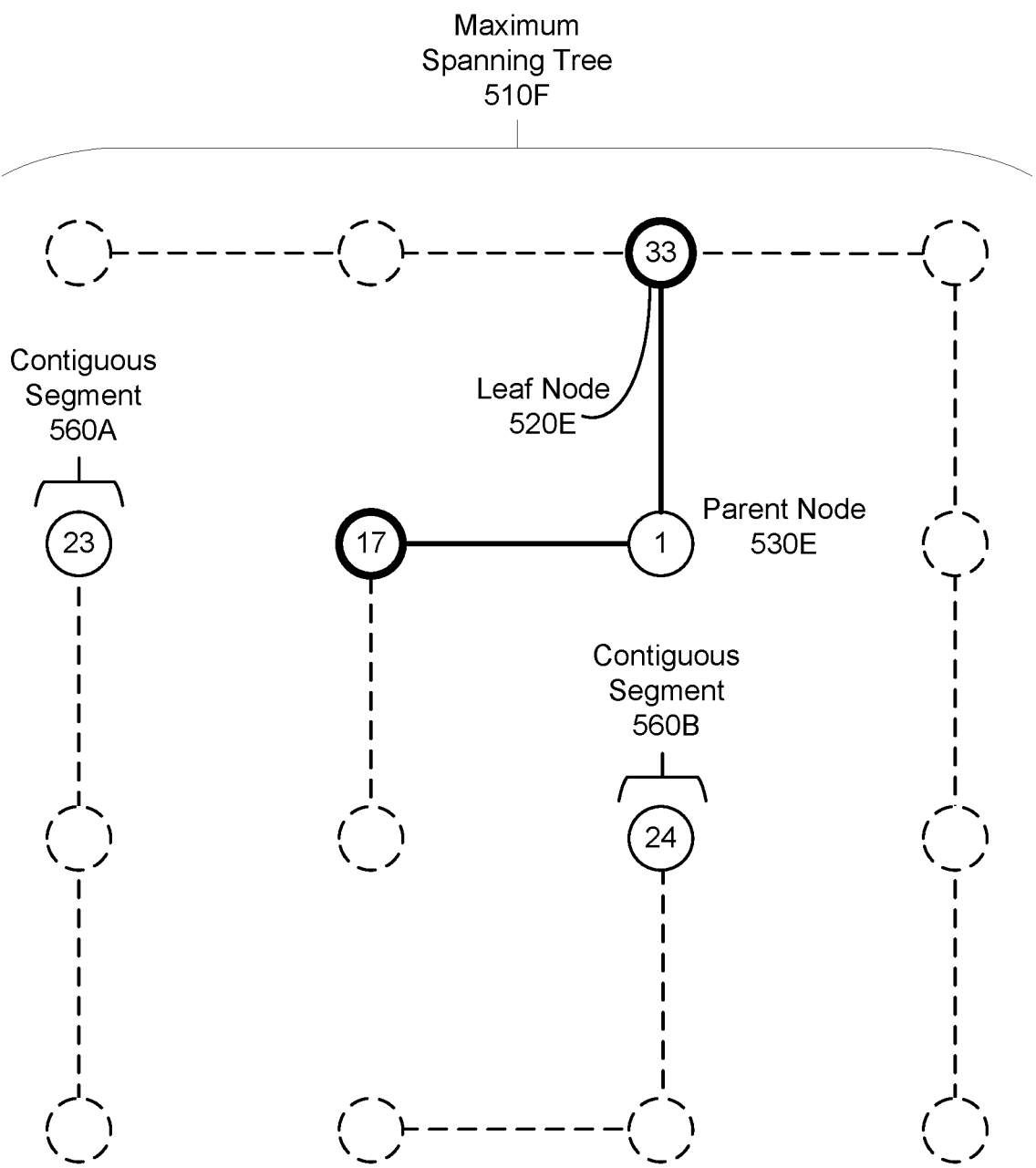
Figure 5H:
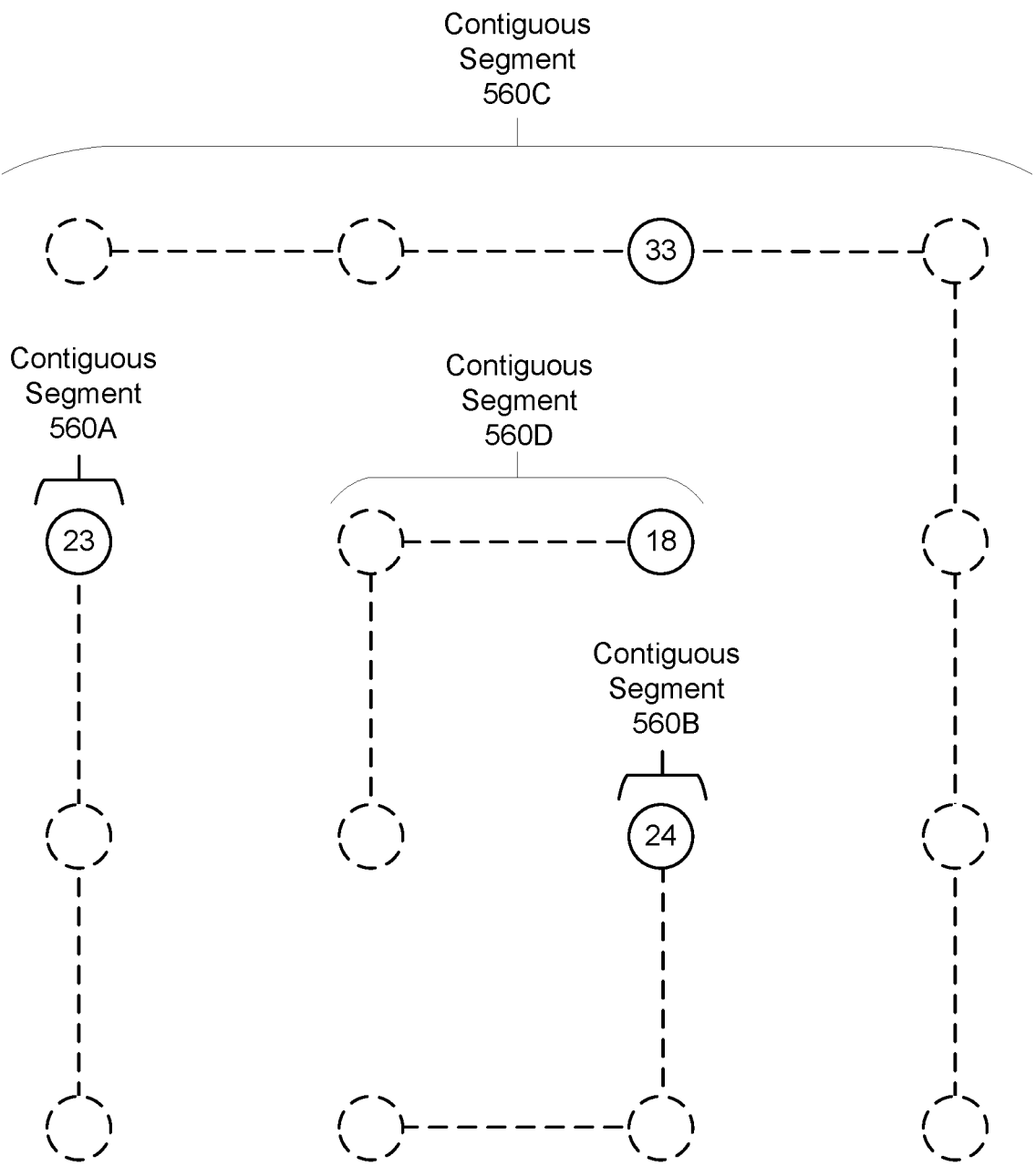

In this example, the region division module 330 keeps partitioning the maximum spanning tree 510E into contiguous segments 560 to reach a threshold number of three contiguous segments 560. As shown in FIG. 5G, the region division module 330 merges each leaf node 520D into its parent node 530D, resulting in a new maximum spanning tree 510F with a new set of leaf nodes 520E and parent nodes 530E. The maximum spanning tree 510F has one leaf node 520E that satisfies the node weight-related criteria, so the region division module 330 disconnects that leaf node 520E to create a new contiguous segment 560C, shown in FIG. 5H. Since the region division module 330 has reached the threshold number of three contiguous segments 560, the region division module 330 forms the remaining nodes into a final contiguous segment 560D.

Figure 6A:
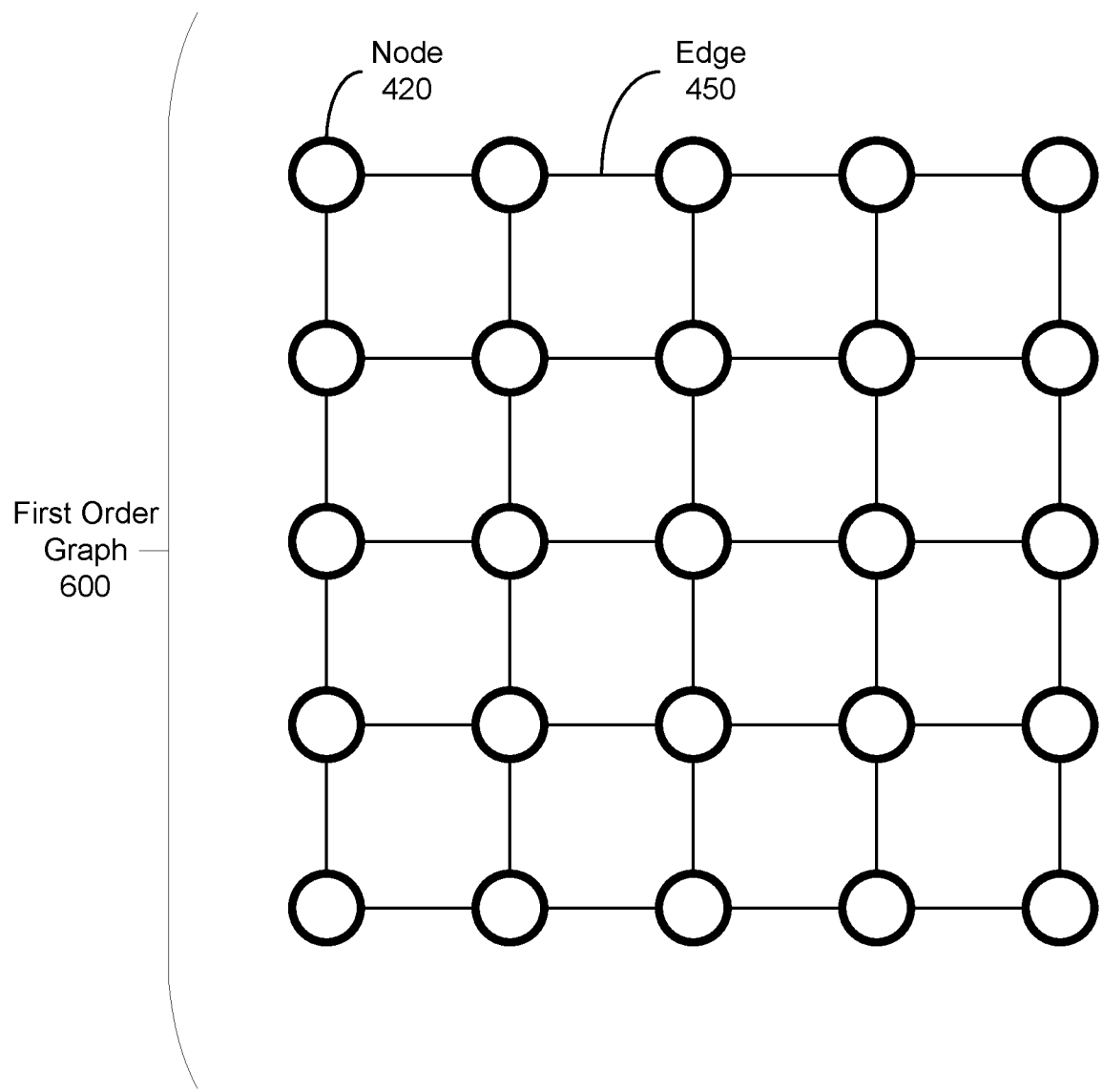
FIGS. 6A-6G illustrate an example of partitioning a first order graph to determine a second order graph, according to one embodiment.

FIGS. 6A-6G illustrate an example of partitioning a first order graph to determine a second order graph, according to one embodiment. For a first order region, which covers a geographic area, the region division module 330 creates a first order graph 600 of nodes 420 and edges 450 corresponding to cells that divide up the first order region, as shown in FIG. 6A. In some embodiments, the first order region may span the entire real world and the cells used to create the first order graph may be S2-cells that are able to map a spherical first order region (i.e., the globe).

Figure 6B:
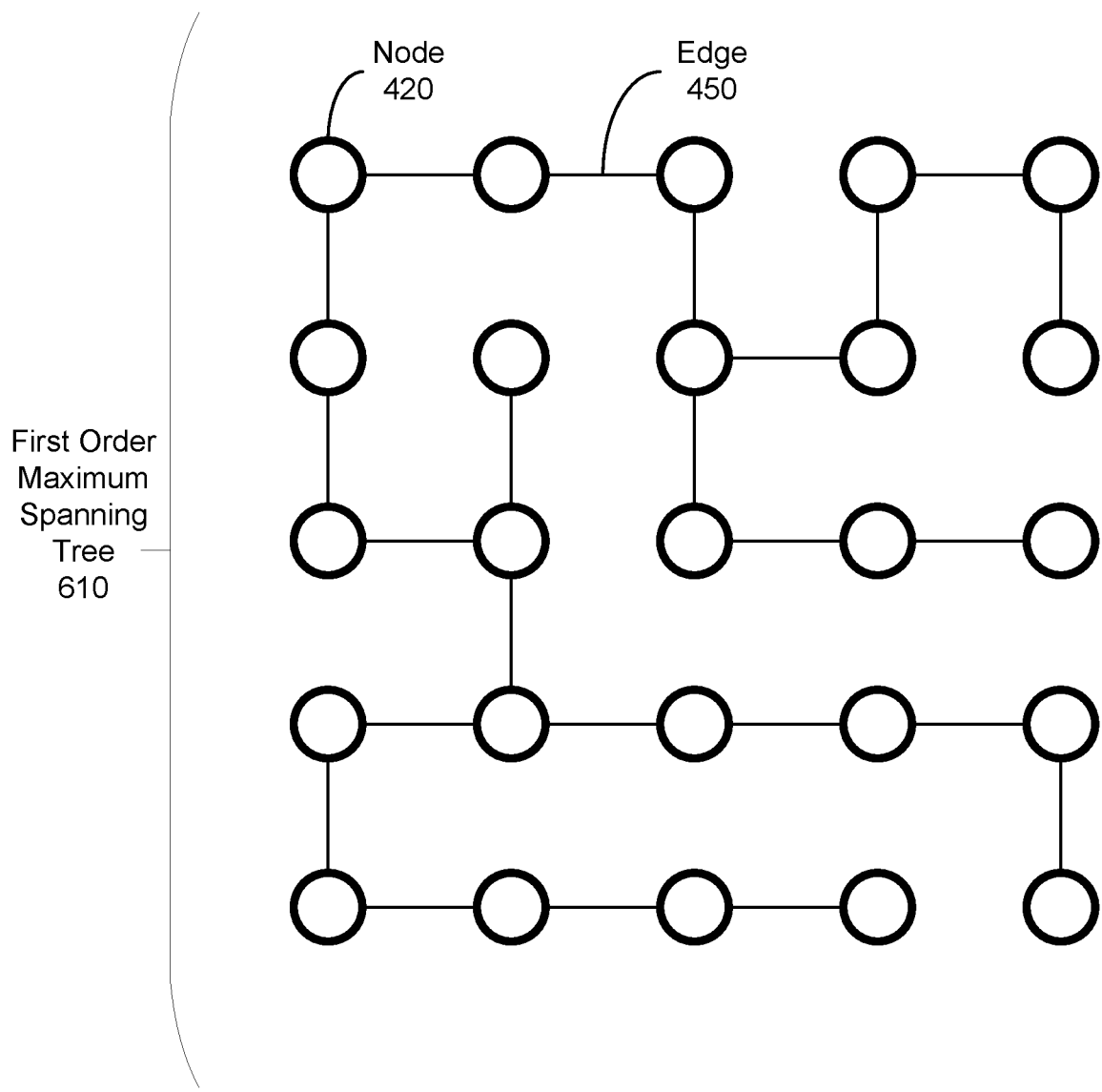
Figure 6C:
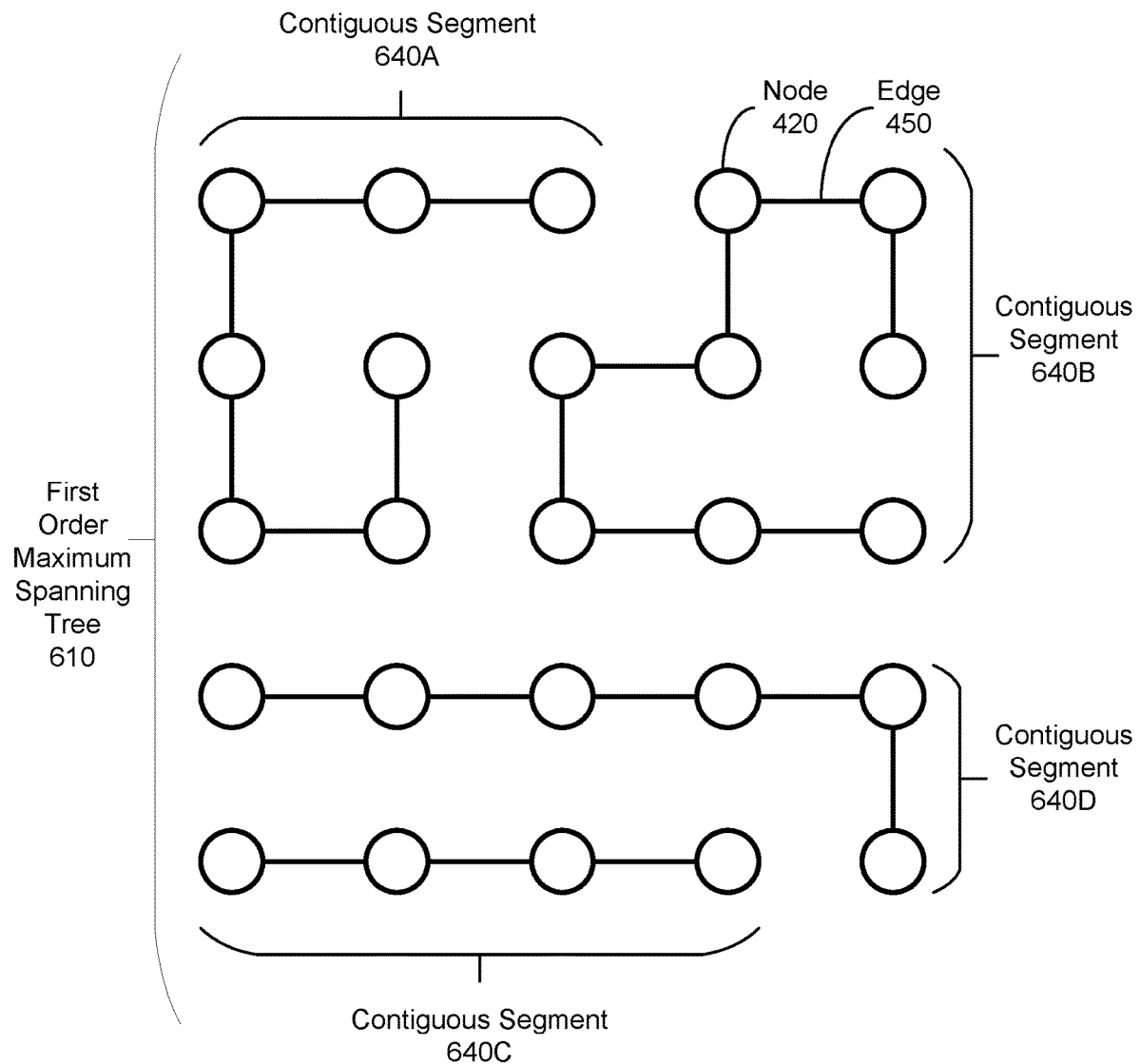

The region division module 330 creates a first order maximum spanning tree 610, shown in FIG. 6B, using the first order graph 600. The maximum spanning tree 610 includes all of the nodes 420 of the first order graph 600 but only a subset of the edges 450 of the first order graph 600. As shown in FIG. 6C, the region division module 330 partitions the first order maximum spanning tree 610 into contiguous segments 640. Though only four contiguous segments are shown in this embodiment, in other embodiments, the region division module 330 may partition maximum spanning trees into more or less contiguous segments based on a threshold number.

Figure 6D:
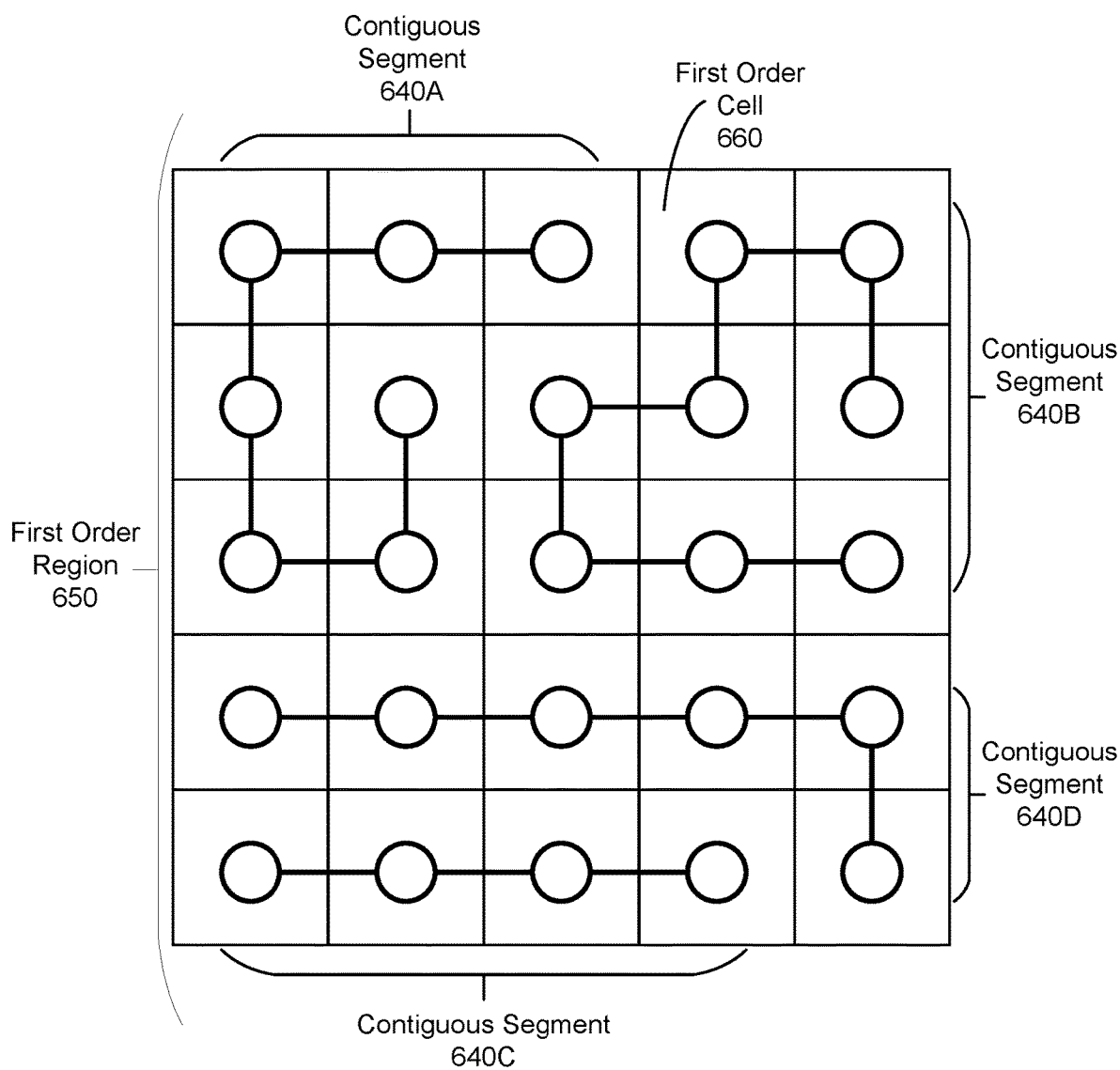
Figure 6E:
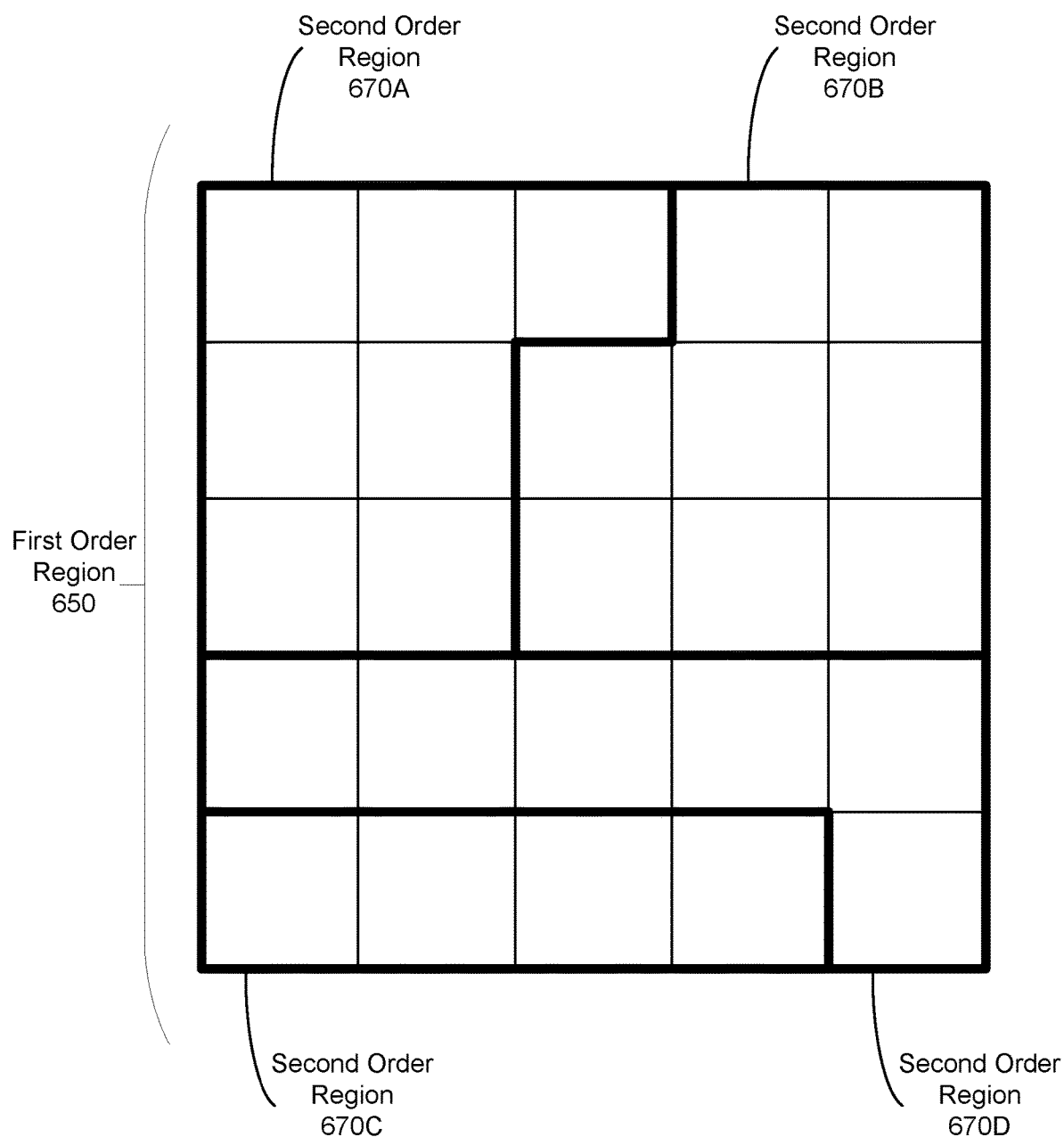
Figure 6F:
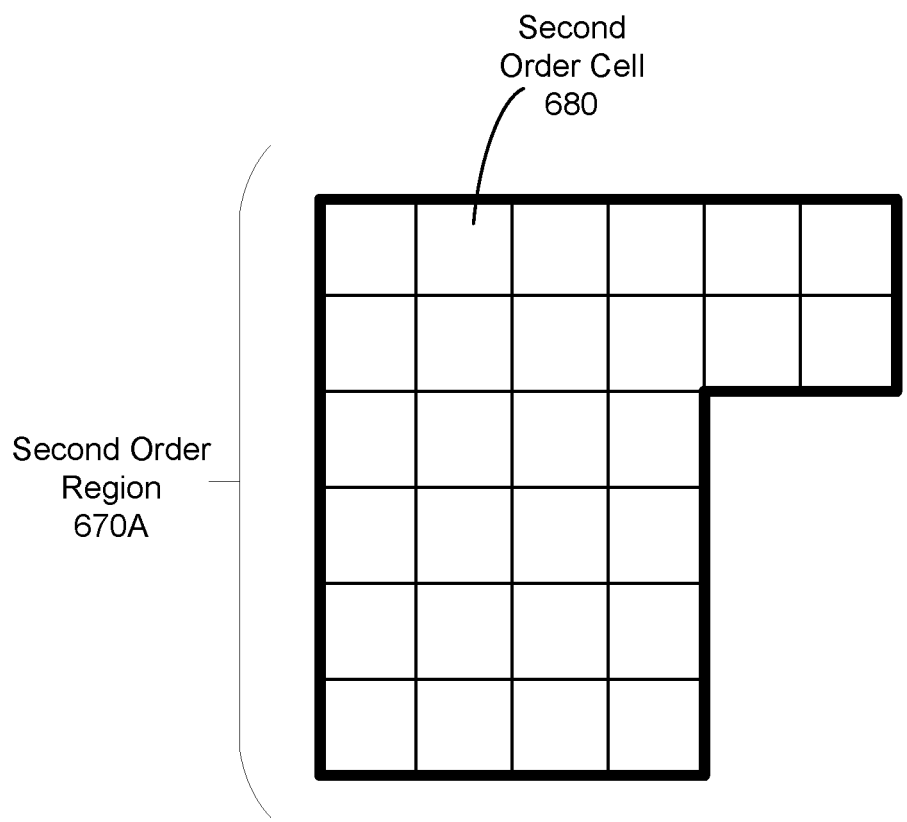

As shown in FIG. 6D, each contiguous segment maps to a set of first order cells 660 of the first order region 650 that each cover a geographic area of the first order region 650. The region division module 330 defines the portion of the geographic area covered by the first order cells 660 of each contiguous segment 640 as a second order region 670. For the second order regions 670 of FIG. 6E, the region division module 330 determines if they each meet a set of criteria, such as covering less than a threshold portion of the first order region 650 or corresponding to less than a threshold percentage of the population of the first order region 650.

Figure 6G:
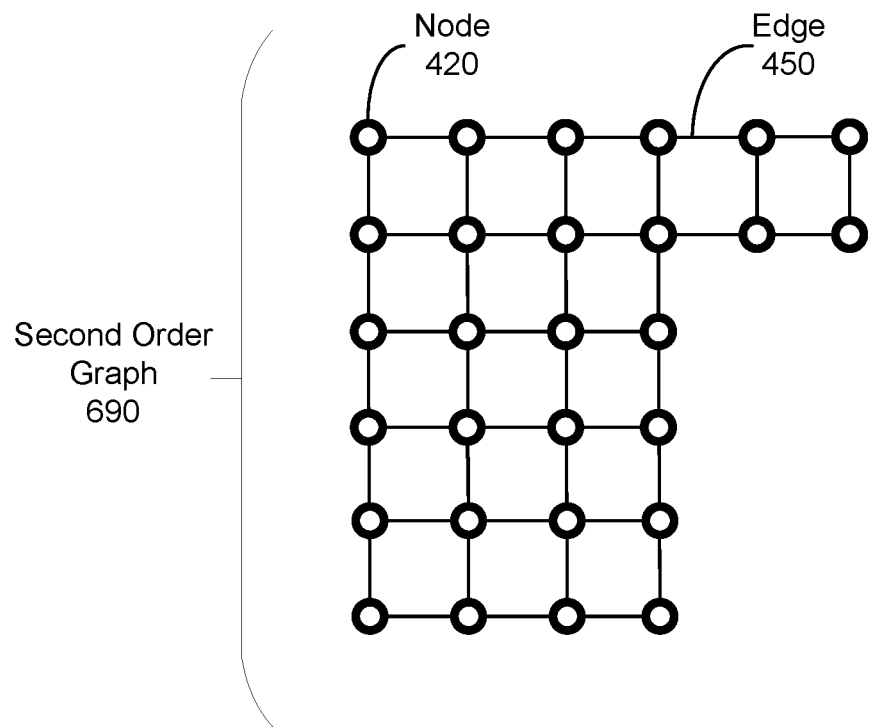

For each second order region 670 that do meet the set of criteria, the region division module 330 may store the second order region in the game database 340 as a region for the parallel reality game. Otherwise, the region division module 330 may divide each of the remaining second order regions 670 second order cells 680, as shown with second order region 670A in FIG. 6F. The region division module 330 creates a second order graph 690 for the second order region 670A based on the second order cells 680 using nodes 420 and edges 450, as shown in FIG. 6G. The region division module 330 may continue this process of hierarchically determining higher orders of regions until each region meets the set of criteria.

Figure 7:
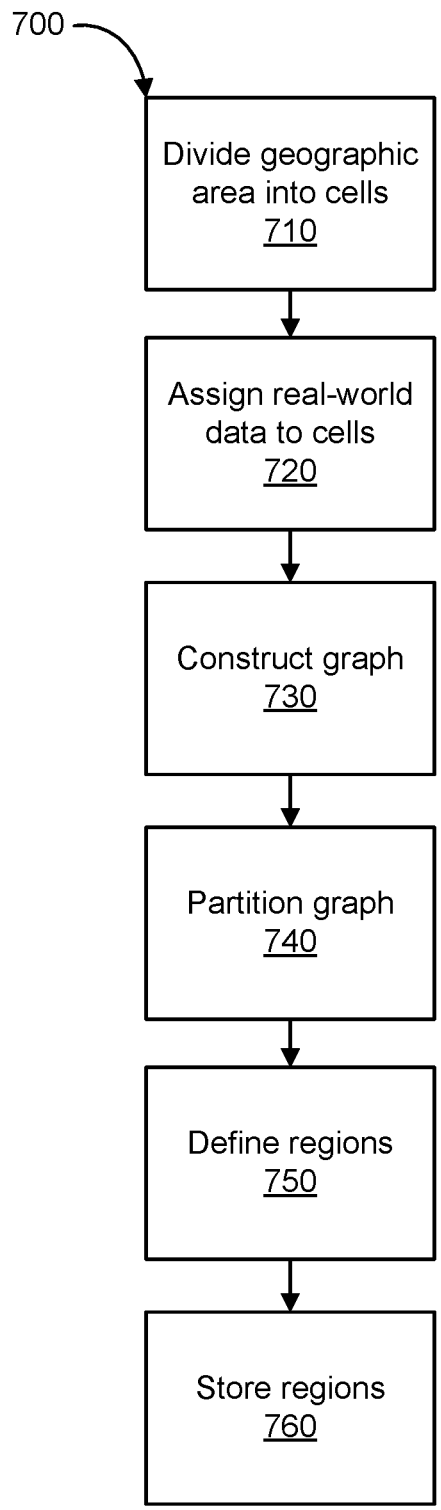
FIG. 7 is a flowchart illustrating the process of dividing a geographic area into regions, according to one embodiment.

FIG. 7 is a flowchart illustrating the process 700 of dividing a geographic area into regions, according to one embodiment. The region division module 330 divides 710 the geographic area into cells, where each cell corresponds to a portion of the geographic area. In some embodiments, the cells are S2-cells. The region division module 330 access the game database 340 to obtain real-world data and assigns 720 real-world data to each of the cells. The real-world data may include population density data corresponding to the cells, player density data describing locations of players of the parallel reality game in the geographic area, terrain data describing locations of water within the geographic area, and/or point of interest data describing real-world locations that correspond to locations of virtual elements in the virtual world.

The region division module 330 constructs 730 a graph including nodes and edges based on the cells of the geographic area. Each node corresponds to a cell, and each edge connects nodes that correspond to adjacent cells in the geographic area. The region division module 330 partitions 740 the graph into contiguous segments based on the real-world data. In some embodiments, each contiguous segment corresponds to a region that includes at least a minimum number of players and/or a region that includes a least a minimum number of points of interest. In other embodiments, while partitioning the graph, the region division module 330 determines a total population of at least some of the contiguous segments from the population density data.

The region division module 330 defines 750 regions of the geographic area based on the contiguous segments of the graph. In some embodiments, when defining regions, the region division module 330 removes portions of the geographic area the correspond to water in the regions. In other embodiments, when defining the regions, the region division module 330 merges a pair of contiguous segments of the graph into a combined (or merged) segment and re-partitions the combined segment into a pair of re-partitioned segments. If the re-partitioned segments meet one or more criteria, the region division module 330 keeps the re-partitioned segments and uses the re-partitioned segments to define regions of the geographic area. The region division module 330 stores 760 the regions in the game database 340. In some embodiments, the region division module 330 stores the regions in another data store associated with the game server 110.

In some embodiments, the process 700 of FIG. 7 is iterative. In these embodiments, the region division module 330 partitions the graph into a set of first order contiguous segments. For each first order segment, the region division module 330 partitions the first order contiguous segment into a set of second order contiguous segments. Further, the iterative process 700 may generate a first contiguous segment from the graph using the region division module 330. To generate the first contiguous segment, the region division module 330 selects a node of the graph. The region division module 330 iteratively merges nodes connected to the selected node into the selected node. For each iteration, the region division module 330 determines a set of nodes connected to the selected node by edges on the graph and merges a node of the set of nodes into the selected node based on the edges weights of the edges connecting the set of nodes to the selected node. The region division module 330 merges nodes until the region division module 330 has formed a first contiguous segment.

The region division module 330 determines if the first contiguous segment meets one or more criteria. If the contiguous segment does meet the one or more criteria, the region division module 330 removes the first contiguous segment from the graph and generates a second contiguous segment from the remaining graph. In some embodiments, if the contiguous segment does not meet the one or more criteria, the region division module 330 generates new edge weights for the edges of the graph and regenerates the first contiguous segment based on the new edge weights.

Figure 8:
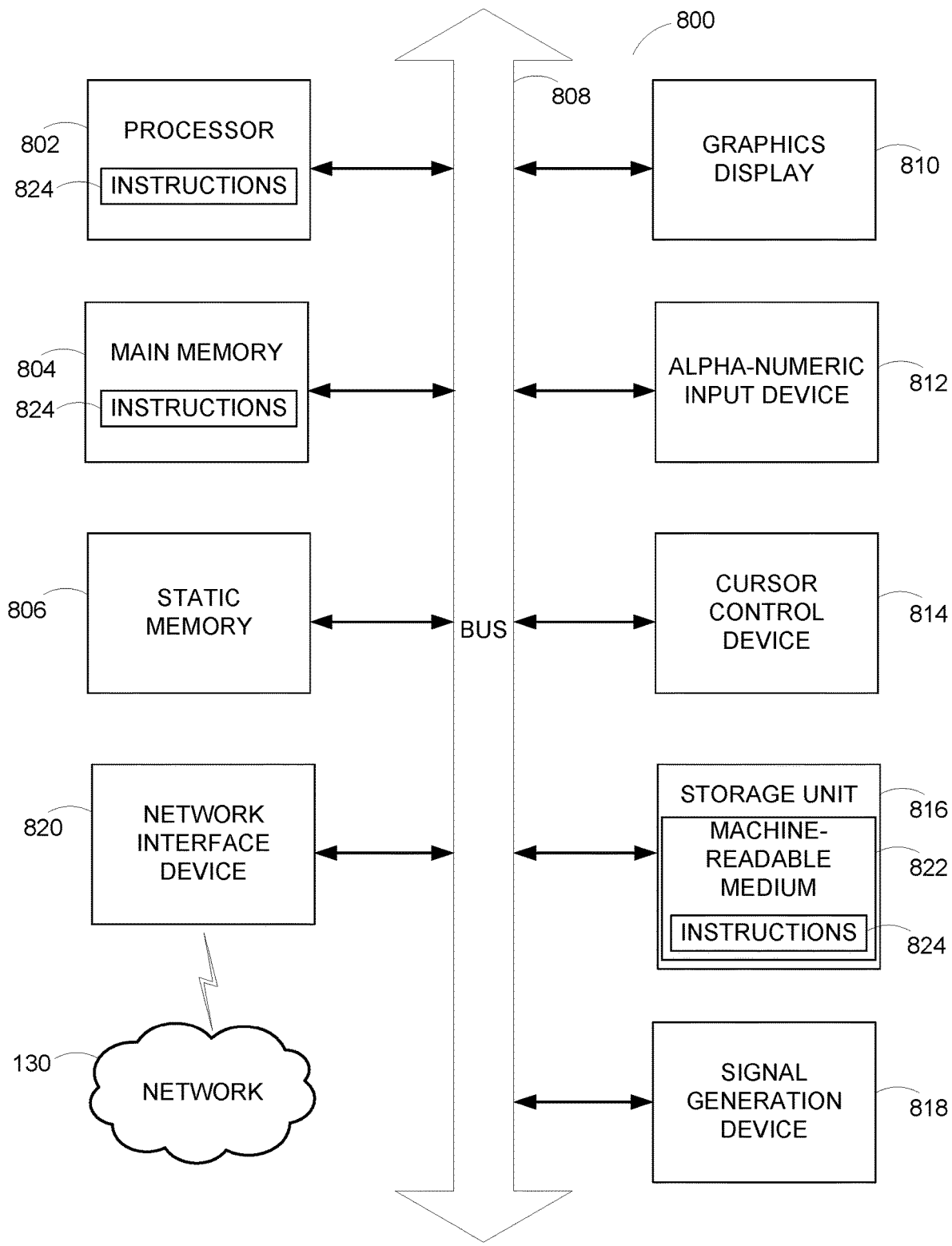
FIG. 8 is a block diagram illustrating an example computer suitable for use in the network computing environment of FIG. 1, according to one embodiment.

FIG. 8 is a block diagram illustrating an example computer suitable for use in the network computing environment of FIG. 1, according to one embodiment. Specifically, FIG. 8 shows a diagrammatic representation of a machine in the example form of a computer system 800. The computer system 800 can be used to execute instructions 824 (e.g., program code or software) for causing the machine to perform any one or more of the methodologies (or processes) described herein, including those associated, and described, with the components (or modules) of a game server 110 or client device 120.

The machine may be a server computer, a client computer, a personal computer (PC), a tablet PC, a set-top box (STB), a smartphone, a network router, switch or bridge, a cell phone tower, or any machine capable of executing instructions 824 (sequential or otherwise) that specify actions to be taken by that machine. Further, while only a single machine is shown, the term "machine" shall also be taken to include any collection of machines that individually or jointly execute instructions 824 to perform any of the disclosed methods.

The example computer system 800 includes one or more processing units (generally one or more processors 1002). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference to a processor 802 may refer to a single processor or multiple processors. The computer system 800 also includes a main memory 804. The computer system may include a storage unit 816. The processor 802, memory 804, and storage unit 816 communicate via a bus 808.

In addition, the computer system 800 can include a static memory 806, a display driver 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 which may store instructions 824 (e.g., software) for performing any of the methods or functions described herein. The instructions 824 may also reside, completely or partially, within the main memory 804 or within the processor 802 (e.g., within a processor's cache memory) during execution by the computer system 800. The main memory 804 and the processor 802 also constitute machine-readable media. The instructions 824 may be transmitted or received over a network 130 via the network interface device 820.

While the machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methods or functions disclosed herein. The term "machine-readable medium" includes, but is not limited to, data repositories in the form of solid-state memories, optical media, and magnetic media.

While the present subject matter has been described in detail with respect to specific exemplary embodiments and methods thereof it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

Reference to servers, databases, software applications, and other computer-based systems, as well as actions taken and information sent to and from such systems, are provided to illustrate various concepts. One of ordinary skill in the art will recognize that the inherent flexibility of computer-based systems allows for a great variety of possible configurations, combinations, and divisions of tasks and functionality between and among components. For instance, server processes may be implemented using a single server or multiple servers working in combination, databases and applications may be implemented on a single system or distributed across multiple systems, and distributed components may operate sequentially or in parallel.

In situations in which the systems and methods access and analyze personal information about players, such as location information, the players may be provided with an opportunity to control whether programs or features collect the information. No such information or data is collected or used until the player has been provided meaningful notice of what information is to be collected and how the information is used. The information is not collected or used unless the player provides consent, which can be revoked or modified by the player at any time. Thus, the player can have control over how information about the player is collected and used by the application or system. In addition, certain information or data can be treated in one or more ways before it is stored or used, so that it is anonymized. For example, a player's identity may be treated so that no personally identifiable information can be determined for the player.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for using ad hoc neural networks to process transactions. Thus, while particular embodiments and applications have been illustrated and described, it is to be understood that the described subject matter is not limited to the precise construction and components disclosed. The scope of protection should be limited only by the following claims.

What is claimed is:

1. A method for dividing a geographic area into regions, the method comprising:
   dividing the geographic area into cells, each cell corresponding to a portion of the geographic area;
   assigning real-world data to the cells, the real-world data for a cell indicating properties of the corresponding portion of the geographic area;
   constructing a graph including nodes and edges, the nodes corresponding to the cells and the edges connecting nodes that correspond to adjacent cells;
   partitioning the graph into contiguous segments based on the real-world data using an iterative process;
   defining regions of the geographic area based on the contiguous segments of the graph; and
   storing the defined regions in a data store.

2. The method of claim 1, wherein the real-world data includes population density data corresponding to the cells, and wherein partitioning the graph into contiguous segments includes determining a total population of at least some of the contiguous segments from the population density data.

3. The method of claim 1, wherein the real-world data includes player density data, the player density data describing locations of players of a parallel reality game in the geographic area, and wherein each contiguous segment corresponds to a region that includes at least a minimum number of players.

4. The method of claim 1, wherein the real-world data includes terrain data, the terrain data describing locations of water within the geographic area, and wherein defining the regions of the geographic area comprises removing portions of the geographic area that correspond to water from the regions.

5. The method of claim 1, wherein the real-world data includes point of interest data, the point of interest data describing real-world locations that correspond to locations of virtual elements in a virtual world, and wherein each contiguous segment corresponds to a region that includes at least a minimum number of points of interest.

6. The method of claim 1, wherein the iterative process includes:
   partitioning the graph into a set of first order contiguous segments; and
   for each first order contiguous segment, partitioning the first order contiguous segment into a set of second order contiguous segments.

7. The method of claim 1, wherein defining regions of the geographic area based on the contiguous segments of the graph comprises:
   combining a pair of contiguous segments of the graph to obtain a combined segment;
   re-partitioning the combined segment into a pair of re-partitioned segments; and
   responsive to the repartitioned segments meeting one or more criteria, keeping the re-partitioned segments for defining regions of the geographic area.

8. The method of claim 1, wherein the iterative process comprises:
   generating a first contiguous segment from the graph;
   responsive to the first contiguous segment meeting one or more criteria, removing the first contiguous segment from the graph; and
   generating a second contiguous segment from the remaining graph.

9. The method of claim 8, wherein generating the first contiguous segment from the graph comprises:
selecting a node of the graph;
iteratively merging nodes connected to the selected node into the selected node, each iteration comprising:
determining a set of nodes connected to the selected node, the nodes connected by edges in the graph; and
merging a node of the set of nodes into the selected node based on weightings of edges connecting the set of nodes to the selected node.

10. The method of claim 9, wherein the edges are weighted by the real-world data and generating the first contiguous segment from the graph further comprises, responsive to the first contiguous segment not meeting one or more criteria:
generating new weights for the edges in the graph; and
regenerating the first contiguous segment based on the new weights.

11. A non-transitory computer-readable storage medium comprising instructions executable by a processor, the instructions comprising:
instructions to divide the geographic area into cells, each cell corresponding to a portion of the geographic area;
instructions to assign real-world data to the cells, the real-world data for a cell indicating properties of the corresponding portion of the geographic area;
instructions to construct a graph including nodes and edges, the nodes corresponding to the cells and the edges connecting nodes that correspond to adjacent cells;
instructions to partition the graph into contiguous segments based on the real-world data using an iterative process;
instructions to define regions of the geographic area based on the contiguous segments of the graph; and
instructions to store the defined regions in a data store.

12. The non-transitory computer-readable storage medium of claim 11, wherein the real-world data includes population density data corresponding to the cells, and wherein the instructions to partition the graph into contiguous segments include instructions to determine a total population of at least some of the contiguous segments from the population density data.

13. The non-transitory computer-readable storage medium of claim 11, wherein the real-world data includes player density data, the player density data describing locations of players of a parallel reality game in the geographic area, and wherein each contiguous segment corresponds to a region that includes at least a minimum number of players.

14. The non-transitory computer-readable storage medium of claim 11, wherein the real-world data includes terrain data, the terrain data describing locations of water within the geographic area, and wherein the instructions to define the regions of the geographic area comprise instructions to remove portions of the geographic area that correspond to water from the regions.

15. The non-transitory computer-readable storage medium of claim 11, wherein the real-world data includes point of interest data, the point of interest data describing real-world locations that correspond to locations of virtual elements in a virtual world, and wherein each contiguous segment corresponds to a region that includes at least a minimum number of points of interest.

16. The non-transitory computer-readable storage medium of claim 11, wherein the instructions to partition the graph into contiguous segments based on the real-world data comprise:
instructions to partition the graph into a set of first order contiguous segments; and
instructions to, for each first order contiguous segment, partition the first order contiguous segment into a set of second order contiguous segments.

17. The non-transitory computer-readable storage medium of claim 11, wherein the instructions to define regions of the geographic area comprise:
instructions to combine a pair of contiguous segments of the graph to obtain a combined segment;
instructions to re-partition the combined segment into a pair of re-partitioned segments; and
instructions to keep, responsive to the repartitioned segments meeting one or more criteria, the re-partitioned segments for defining regions of the geographic area.

18. The non-transitory computer-readable storage medium of claim 11, wherein the instructions to partition the graph into contiguous segments comprise:
instructions to generate a first contiguous segment from the graph;
instructions to remove, responsive to the first contiguous segment meeting one or more criteria, the first contiguous segment from the graph; and
instructions to generate a second contiguous segment from the remaining graph.

19. The non-transitory computer-readable storage medium of claim 18, wherein the instructions to generate the first contiguous segment from the graph comprise:
instructions to select a node of the graph;
instructions to iteratively merge nodes connected to the selected node into the selected node in the iterative process, each iteration comprising:
determining a set of nodes connected to the selected node, the nodes connected by edges in the graph; and
merging a node of the set of nodes into the selected node based on weightings of edges connecting the set of nodes to the selected node.

20. The non-transitory computer-readable storage medium of claim 19, wherein the edges are weighted by the real-world data and the instructions to generate the first contiguous segment from the graph further comprise:
instructions to generate, responsive to the first contiguous segment not meeting one or more criteria, new weights for the edges in the graph; and
instructions to regenerate the first contiguous segment based on the new weights.

* * * * *